United States Patent
Ohsaka et al.

(10) Patent No.: US 12,442,749 B2
(45) Date of Patent: Oct. 14, 2025

(54) DISEASE DIFFERENTIATION SUPPORT METHOD, DISEASE DIFFERENTIATION SUPPORT APPARATUS, AND DISEASE DIFFERENTIATION SUPPORT COMPUTER PROGRAM

(71) Applicants: JUNTENDO EDUCATIONAL FOUNDATION, Tokyo (JP); SYSMEX CORPORATION, Kobe (JP)

(72) Inventors: Akimichi Ohsaka, Tokyo (JP); Yoko Tabe, Tokyo (JP); Konobu Kimura, Kobe (JP)

(73) Assignees: JUNTENDO EDUCATIONAL FOUNDATION, Tokyo (JP); SYSMEX CORPORATION, Kobe (JP)

(*) Notice: Subject to any disclaimer, the term of this patent is extended or adjusted under 35 U.S.C. 154(b) by 492 days.

(21) Appl. No.: 17/955,083

(22) Filed: Sep. 28, 2022

(65) Prior Publication Data

US 2023/0028011 A1   Jan. 26, 2023

Related U.S. Application Data

(63) Continuation of application No. PCT/JP2021/013583, filed on Mar. 30, 2021.

(30) Foreign Application Priority Data

Mar. 30, 2020   (JP) .................. 2020-060956

(51) Int. Cl.
*G01N 15/1433* (2024.01)
*G01N 15/1429* (2024.01)
(Continued)

(52) U.S. Cl.
CPC ..... *G01N 15/1433* (2024.01); *G01N 15/1429* (2013.01); *G01N 33/48* (2013.01);
(Continued)

(58) Field of Classification Search
CPC .......... G01N 15/1433; G01N 15/1429; G01N 33/48; G01N 2015/012; G01N 2015/016;
(Continued)

(56) References Cited

U.S. PATENT DOCUMENTS 9,989,523 B2 †   6/2018   Kasdan
10,126,292 B2    11/2018  Abe et al.
(Continued)

FOREIGN PATENT DOCUMENTS

EP   3721231 B1 †   10/2020
JP   2002-140692 A    5/2002
(Continued)

OTHER PUBLICATIONS

Russian Office Action with English Translation for the corresponding Russian Patent Application No. 2022127832, dated Jan. 23, 2024, 13 pages.
(Continued)

*Primary Examiner* — Wassim Mahrouka
(74) *Attorney, Agent, or Firm* — Crowell & Moring LLP

(57) ABSTRACT

Disclosed is a disease differentiation support method for supporting disease differentiation, the disease differentiation support method including: obtaining a first parameter obtained by analyzing an image including a cell contained in a sample collected from a subject; obtaining a second parameter regarding a number of cells contained in the sample; and generating, by using a computer algorithm, differentiation support information for supporting disease differentiation, on the basis of the first parameter and the second parameter.

18 Claims, 16 Drawing Sheets

(51) Int. Cl.
| | |
|---|---|
| *G01N 33/48* | (2006.01) |
| *G06N 3/08* | (2023.01) |
| *G06N 20/20* | (2019.01) |
| *G16H 10/40* | (2018.01) |
| *G16H 30/40* | (2018.01) |
| *G16H 50/20* | (2018.01) |

(52) U.S. Cl.
CPC .............. *G06N 3/08* (2013.01); *G06N 20/20* (2019.01); *G16H 10/40* (2018.01); *G16H 30/40* (2018.01); *G16H 50/20* (2018.01)

(58) Field of Classification Search
CPC ..... G01N 2015/018; G01N 2015/1024; G01N 15/1031; G01N 2015/0294; G01N 2015/1486; G01N 15/0227; G01N 15/147; G01N 2015/1493; G01N 2015/1497; G06N 3/08; G06N 20/20; G06N 3/045; G06N 5/01; G06N 7/01; G06N 20/10; G16H 10/40; G16H 30/40; G16H 50/20; G16H 40/67; G16H 50/70; G06V 10/82; G06V 20/698
See application file for complete search history.

(56) References Cited

U.S. PATENT DOCUMENTS

| | | | |
|---|---|---|---|
| 10,304,188 B1 † | 5/2019 | Kumar | |
| 10,488,644 B2 † | 11/2019 | Eshel | |
| 10,534,009 B2 † | 1/2020 | Holmes | |
| 11,093,729 B2 | 8/2021 | Ohsaka et al. | |
| 2007/0014460 A1 | 1/2007 | Kuziela et al. | |
| 2008/0090252 A1* | 4/2008 | Ponikau | G01N 33/5091 435/7.1 |
| 2010/0248347 A1 | 9/2010 | Tanaka et al. | |
| 2013/0094750 A1 | 4/2013 | Tasdizen et al. | |
| 2014/0051071 A1 | 2/2014 | Yoshida et al. | |
| 2015/0037806 A1 † | 2/2015 | Pollak | |
| 2015/0276720 A1 | 10/2015 | Abe et al. | |
| 2017/0011253 A1 | 1/2017 | Yu et al. | |
| 2018/0211380 A1 | 7/2018 | Tandon et al. | |
| 2018/0247195 A1 | 8/2018 | Kumar et al. | |
| 2019/0347467 A1 | 11/2019 | Ohsaka et al. | |
| 2020/0340909 A1 | 10/2020 | Ohsaka et al. | |
| 2021/0303818 A1* | 9/2021 | Randolph | G06N 3/084 |
| 2021/0365668 A1 | 11/2021 | Ohsaka et al. | |
| 2022/0180975 A1* | 6/2022 | Regev | G16B 40/20 |

FOREIGN PATENT DOCUMENTS

| | | |
|---|---|---|
| JP | 2003-240777 A | 8/2003 |
| JP | 2004-170368 A | 6/2004 |
| JP | 2010-237001 A | 10/2010 |
| JP | 2015-194358 A | 11/2015 |
| JP | 2016505836 A | 2/2016 |
| JP | 2016-510418 A | 4/2016 |
| JP | 2018-510340 A | 4/2018 |
| JP | 2018-534605 A | 11/2018 |
| JP | 2019-195304 A | 11/2019 |
| JP | 2020-180954 A | 11/2020 |
| WO | WO2014094790 A1 | 6/2014 |
| WO | WO2014/127379 A1 | 8/2014 |
| WO | WO 2016/144728 A2 | 9/2016 |
| WO | WO2017/046799 A1 | 3/2017 |
| WO | WO 2020/028313 A1 | 2/2020 |

OTHER PUBLICATIONS

Russian Office Action with English Translation, dated Jun. 5, 2023, pp. 1-10, issued in Russian Patent Application No. 2022127832, Russian Federation, Intellectual Property Offices, Moscow.
Office Action in Japanese Patent Application No. 2020-060956, dated Aug. 27, 2024 (5 pages).
Protocol of the Meeting of Experts (Russian and English Translation) Dated Aug. 6, 2024 for the Corresponding Russian Patent Application No. 2022127832 (18 pages).
Office Action in CN patent application No. 202180026854.5, including English translation, dated Jun. 1, 2024, 15 pages.
Supplementary Extended European Search Report dated Mar. 6, 2024 for the corresponding EP patent application No. 21782000.0, 8 pages.
Third Party Observation dated Sep. 20, 2023 for the corresponding European Patent Application No. 21782000.0, 15 pages.
Information Statement and Reason for Submission filed by Third Party on Sep. 1, 2023 to the corresponding Japanese Patent application No. 2020-060956, including English translation, 29 pages.
Notice of Submission of Publications dated Sep. 26, 2023 for the corresponding Japanese Patent application No. 2020-060956, including English translation, 3 pages.
Russian Office Action with English Translation regarding Russian Application No. 2022127832 dated Feb. 16, 2023, 18 pages.
International Search Report and Written Opinion with Machine Translation, Jun. 15, 2021, pp. 1-15, issued in International Application No. PCT/JP2021/13583, Japan Patent Office, Tokyo, Japan.
Meggendorfer, PhD, Manja , et al., Deep Learning Algorithms Support Distinction of PV, PMF, and ET Based on Clinical and Genetic Markers, Dec. 7, 2017, pp. 1-6, Blood (2017) (Supplement 1): vol. 130, 4223, 635, Myeloproliferative Syndromes: Basic Science: Poster III, American Society of Hematology available at URL https://ashpublications.org/blood/article/130/Supplement%201/4223/72575/Deep-Learning-Algorithms-Support-Distinction-of-PV.
Japanese Office Action with Machine Translation for the corresponding Japanese Patent Application No. 2020-060956, dated Jan. 23, 2024, 8 pages.

* cited by examiner
† cited by third party

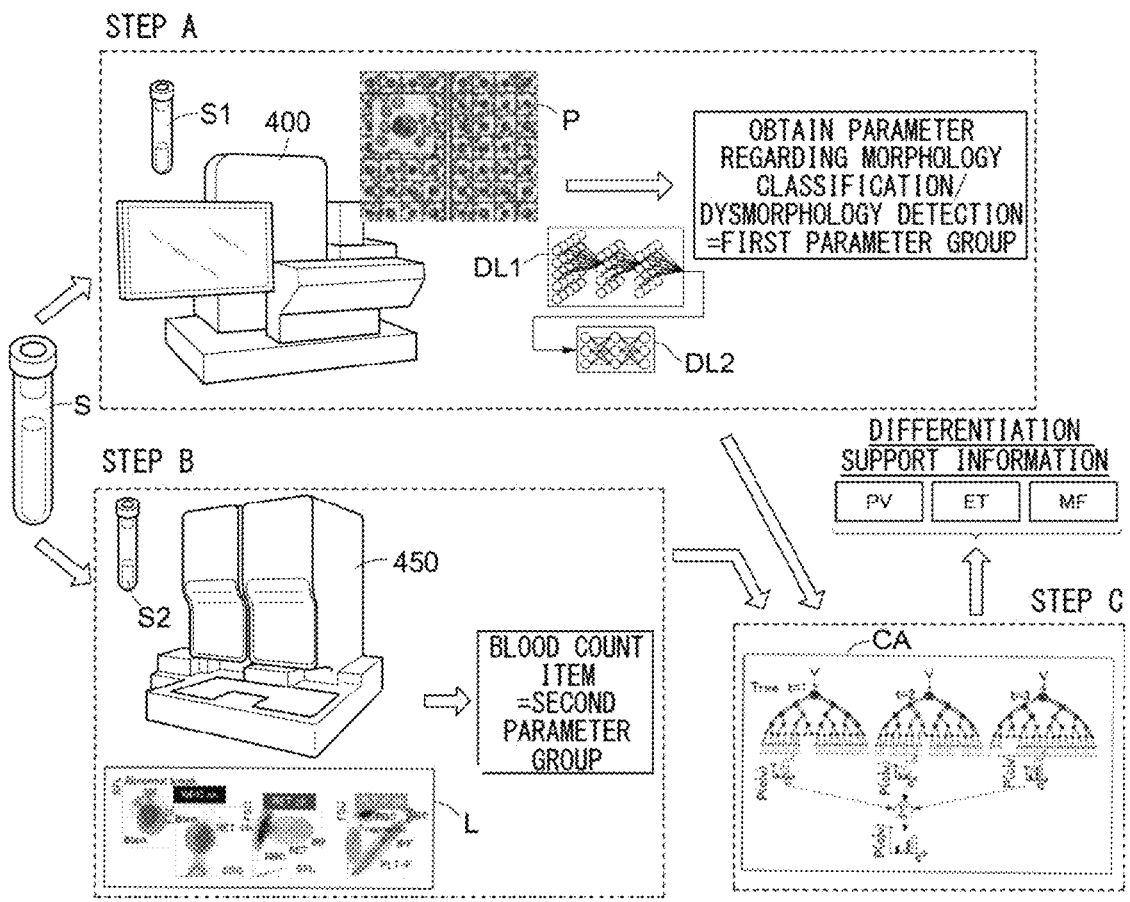

| FIRST PARAMETER NAME | DESCRIPTION |
|---|---|
| morph_BNE | NUMBER OF NEUTROPHIL BAND CELLS |
| morph_BA | NUMBER OF BASOPHILS |
| morph_GRAN-2 | NUMBER OF GRANULOCYTES WITH PSEUDO-PELGER (HYPOSEGMENTATED NUCLEUS) |
| morph_SN-10 | NUMBER OF SEGMENTED NEUTROPHILS WITH TOXIC GRANULE |
| morph_GT | NUMBER OF MEGATHROMBOCYTE |
| morph_GRAN-14 | NUMBER OF GRANULOCYTES WITH APOPTOSIS (KARYOLYSIS IMAGE) |
| morph_MMY | NUMBER OF METAMYELOCYTES |
| morph_MY | NUMBER OF MYELOCYTES |
| morph_SNE | NUMBER OF SEGMENTED NEUTROPHILS |
| morph_LY-2 | NUMBER OF LYMPHOCYTES WITH CLEAVED NUCLEUS |
| morph_GRAN-6 | NUMBER OF GRANULOCYTES WITH NUCLEUS MORPHOLOGY ABNORMALITY |

FIG. 3

| SECOND PARAMETER NAME | DESCRIPTION |
|---|---|
| RBC(10^4uL) | NUMBER OF RED BLOOD CELLS |
| HCT(%) | HEMATOCRIT VALUE |
| MCHC(gdL) | MEAN CELL HEMOGLOBIN CONCENTRATION |
| PLT(10^4uL) | NUMBER OF PLATELETS |
| _NE-WY | DISTRIBUTION WIDTH OF FLUORESCENCE IN NEUTROPHIL REGION |
| _BA-N#(10^2uL) | EOSINOPHIL RATIO |
| _MO-WX | DISTRIBUTION WIDTH OF FLUORESCENCE OF MONOCYTE |
| NRBC#(10^2uL) | NUMBER OF NUCLEATED RED BLOOD CELLS |
| _IG%(%) | RATIO OF NEUTROPHIL HAVING STRONG FLUORESCENCE INTENSITY TO WHITE BLOOD CELL |
| HGB(gdL) | HEMOGLOBIN CONCENTRATION |
| NRBC%(%) | NUMBER OF NUCLEATED RED BLOOD CELLS |
| MCV(fL) | MEAN CORPUSCULAR VOLUME |
| _LY-Y(ch) | FLUORESCENCE INTENSITY IN LYMPHOCYTE REGION |
| _LY-Z(ch) | FORWARD SCATTERED LIGHT INTENSITY IN LYMPHOCYTE REGION |
| _Delta-He(pg) | DIFFERENCE BETWEEN HEMOGLOBIN AMOUNT IN PLATELET AND HEMOGLOBIN AMOUNT IN RED BLOOD CELL |
| _MicroR(%) | SMALL RED BLOOD CELL RATIO |
| _TNC-P(10^2uL) | TOTAL NUMBER OF NUCLEATED CELLS (WHITE BLOOD CELL COUNT+NUCLEATED RED BLOOD CELL COUNT) |
| _MO-Z(ch) | FORWARD SCATTERED LIGHT INTENSITY OF MONOCYTE |
| EO%(%) | EOSINOPHIL RATIO |
| _BA-D#(10^2uL) | NUMBER OF BASOPHILS |
| MCH(pg) | MEAN CORPUSCULAR HEMOGLOBIN |
| _NE-WX | DISTRIBUTION WIDTH OF SIDE SCATTERED LIGHT IN NEUTROPHIL REGION |
| MONO#(10^2uL) | NUMBER OF MONOCYTES |
| _TNC-D(10^2uL) | TOTAL NUMBER OF NUCLEATED CELLS (WHITE BLOOD CELL COUNT+NUCLEATED RED BLOOD CELL COUNT) |
| _LY-WY | DISTRIBUTION WIDTH OF FLUORESCENCE OF LYMPHOCYTE |
| MPV(fL) | MEAN PLATELET VOLUME |
| MONO%(%) | MONOCYTE RATIO |
| PCT(%) | PLATELETCRIT VALUE |

FIG. 4

| PARAMETER GROUP | ROW NUMBER | PARAMETER NAME | PARAMETER | DISEASE LABEL |
|---|---|---|---|---|
| FIRST | 1 | morph_BNE | 10 | |
| | 2 | morph_BA | 10 | |
| | 3 | morph_GRAN-2 | 7 | |
| | 4 | morph_SN-10 | 5 | |
| | 5 | morph_ST | 3 | |
| | 6 | morph_GRAN-14 | 9 | |
| | 7 | morph_MMY | 4 | |
| | 8 | morph_MY | 4 | |
| | 9 | morph_SNE | 3 | |
| | 10 | morph_LY-2 | 10 | |
| | 11 | morph_GRAN-6 | 13 | |
| SECOND | 12 | RBC(10^4uL) | 30 | PV |
| | 13 | HCT(%) | 250 | |
| | 14 | MCHC(g/L) | 40 | |
| | 15 | PLT(10^4uL) | 50 | |
| | 16 | _NE-WY | 10 | |
| | 17 | _BA-N#(10^2uL) | 12 | |
| | 18 | _MO-WX | 30 | |
| | 19 | NRBC#(10^2uL) | 40 | |
| | 20 | IG%(%) | 15 | |
| | 21 | HGB(g/L) | 15 | |
| | 22 | NRBC%(%) | 10 | |
| | 23 | MCV(fL) | 40 | |
| | 24 | _LY-Y(ch) | 12 | |
| | 25 | _LY-Z(ch) | 15 | |
| | 26 | _Delta-He(pg) | 3 | |
| | 27 | _MicroR(%) | 2 | |
| | 28 | _TNC-P(10^2uL) | 1 | |
| | 29 | _MO-Z(ch) | 12 | |
| | 30 | EO%(%) | 5 | |
| | 31 | _BA-D#(10^2uL) | 3 | |
| | 32 | MCH(pg) | 40 | |
| | 33 | _NE-WX | 5 | |
| | 34 | MONO#(10^2uL) | 6 | |
| | 35 | _TNC-D(10^2uL) | 5 | |
| | 36 | _LY-WY | 15 | |
| | 37 | MPV(fL) | 10 | |
| | 38 | MONO%(%) | 6 | |
| | 39 | PCT(%) | 20 | |

|  | N | SENSITIVITY (%) | SPECIFICITY (%) | AUC |
|---|---|---|---|---|
| POLYCYTHEMIA VERA (PV) | 9 | 100.0% | 95.4% | 0.988 |
| ESSENTIAL THROMBOCYTHEMIA (ET) | 53 | 90.6% | 95.2% | 0.967 |
| PRIMARY MYELOFIBROSIS (PMF) | 12 | 100.0% | 90.3% | 0.974 | ns
DISEASE DIFFERENTIATION SUPPORT METHOD, DISEASE DIFFERENTIATION SUPPORT APPARATUS, AND DISEASE DIFFERENTIATION SUPPORT COMPUTER PROGRAM

RELATED APPLICATIONS

This application is a continuation of International Application PCT/JP2021/013583 filed on Mar. 30, 2021, which claims benefit of Japanese patent application JP2020-060956 filed on Mar. 30, 2020, both of which are incorporated herein by reference in their entireties.

BACKGROUND OF THE INVENTION

1. Field of the Invention

A disease differentiation support method, a disease differentiation support apparatus, and a disease differentiation support computer program are disclosed herein.

2. Description of the Related Art

Differentiation of diseases is performed by testing a specimen obtained from a subject. For example, "Deep learning algorithms Support Distinction of PV, PMF, and ET Based on Clinical and Genetic Markers", by Manja Meggendorfer et al., Blood 2017, 130:4223 discloses a method for performing differentiation between polycythemia vera (PV), essential thrombocythemia (ET), and primary myelofibrosis (PMF) in "myeloproliferative neoplasms (MPN)", on the basis of gene expression obtained through next-generation sequencing.

However, conventional tests for disease differentiation require complicated test steps, and tests need to be performed by skilled examiners. Therefore, there is a demand for a novel disease differentiation support method.

SUMMARY OF THE INVENTION

The scope of the present invention is defined solely by the appended claims, and is not affected to any degree by the statements within this summary.

A disease differentiation support method for supporting disease differentiation is disclosed herein. The disease differentiation support method includes: obtaining a first parameter obtained by analyzing an image including a cell contained in a sample collected from a subject; obtaining a second parameter regarding a number of cells contained in the sample; and generating, by using a computer algorithm, differentiation support information for supporting disease differentiation, on the basis of the first parameter and the second parameter.

A disease differentiation support method for supporting disease differentiation is disclosed herein. The disease differentiation support method includes generating, by using a computer algorithm, differentiation support information for supporting disease differentiation, on the basis of a first parameter obtained by analyzing an image including a cell contained in a sample collected from a subject, and a second parameter regarding a number of cells contained in the sample.

A disease differentiation support apparatus for supporting disease differentiation is disclosed herein. The disease differentiation support apparatus includes a processing part. The processing part obtains a first parameter obtained by analyzing an image including a cell contained in a sample collected from a subject, obtains a second parameter regarding a number of cells contained in the sample, and generates, by using a computer algorithm, differentiation support information for supporting disease differentiation, on the basis of the first parameter and the second parameter.

A medium having stored therein a computer program for supporting disease differentiation is disclosed herein. The computer program, when executed by a computer, causes the computer to execute a process including: obtaining a first parameter obtained by analyzing an image including a cell contained in a sample collected from a subject; obtaining a second parameter regarding a number of cells contained in the sample; and generating, by using a computer algorithm, differentiation support information for supporting disease differentiation, on the basis of the first parameter and the second parameter.

BRIEF DESCRIPTION OF THE DRAWINGS

FIG. 1 shows an outline of a method for supporting disease differentiation;

FIG. 2 shows an example of a first parameter group;

FIG. 3 shows an example of a second parameter group;

FIG. 4 shows an example of training data;

DETAILED DESCRIPTION OF THE PREFERRED EMBODIMENTS

Figure 5:
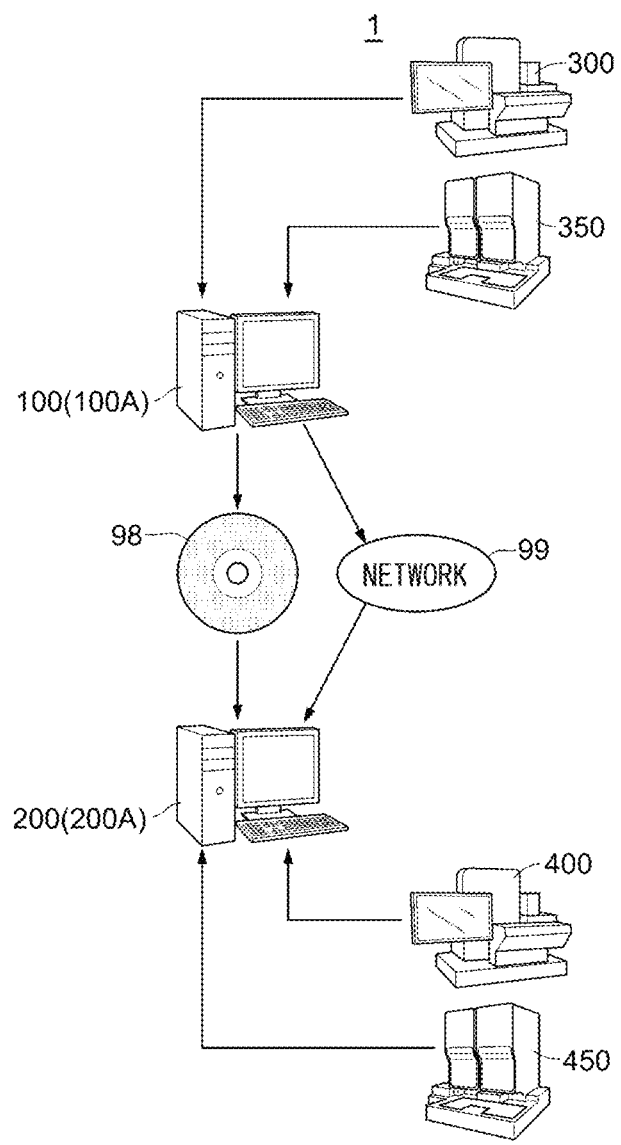
FIG. 5 shows a configuration example of a disease differentiation support system 1.

Hereinafter, an outline and an embodiment of the present invention will be described in detail with reference to the attached drawings. In the following description and drawings, the same reference characters denote the same or similar components, and thus, description of the same or similar components is omitted.

1. Method for Supporting Disease Differentiation 1-1. Outline of Support Method

The present embodiment relates to a disease differentiation support method for supporting disease differentiation (hereinafter, simply referred to as a "support method"). In the support method, a plurality of types of first parameters and a plurality of types of second parameters regarding cells are obtained from a sample containing cells collected from a subject, and differentiation support information for supporting disease differentiation is generated on the basis of the plurality of types of first parameters and the plurality of types of second parameters, by using a computer algorithm.

Each first parameter is obtained from an analysis result obtained through analysis of an image including each cell contained in a sample collected from a subject. Each second parameter is a parameter regarding the number of cells, and is obtained from an analysis result obtained through analysis of an optical signal or an electric signal obtained from each cell contained in the sample. Herein, the parameter regarding the number of cells includes, in addition to a cell count: a concentration (e.g., the concentration of red blood cells per 1 μL), of a specific cell, per a predetermined amount of a sample; and a ratio (e.g., the ratio of eosinophil per 100 white blood cells) of a specific cell relative to a certain cell, which are values calculated on the basis of the cell count.

FIG. 1 shows an outline of the support method. As shown in FIG. 1, a sample S collected from a subject is divided into a specimen S1 to be used in analysis in step A, and a specimen S2 to be used in analysis in step B. In step A, a cell image analysis apparatus 400 captures an image of each cell contained in the specimen S1 and analyzes an obtained cell image P, thereby obtaining a first parameter group composed of a plurality of types of first parameters including a parameter regarding abnormal finding. In step B, a blood cell counter 450 obtains an optical signal L or an electric signal from each cell contained in the specimen S2, and analyzes the obtained optical signal L or electric signal, thereby obtaining a second parameter group composed of a plurality of types of second parameters including the number, ratio, or the like, for each type, of the cell. In step C, the first parameter group composed of the plurality of types of first parameters and the second parameter group composed of the plurality of types of second parameters are inputted to a computer algorithm CA trained in advance, and differentiation support information for supporting disease differentiation is generated.

In the present embodiment, cells contained in a sample belong to a predetermined cell group. The predetermined cell group is a cell group that forms a corresponding organ of a human. The predetermined cell group, when normal, includes a plurality of types of cells that are morphologically classified through histological microscopy or cytological microscopy. Morphological classification (also referred to as "morphology classification") includes classification of types of cells and classification of morphological features of cells. Preferably, cells being analysis targets are a cell group that belongs to a predetermined cell lineage that belongs to a predetermined cell group. The predetermined cell lineage is a cell group that belongs to the same lineage differentiated from a certain type of tissue stem cell. The predetermined cell lineage is preferably the hematopoietic system, and hematopoietic cells are preferably peripheral blood cells or bone marrow cells.

In general, in a blood test, by using a sample S of the hematopoietic system collected from a subject, a blood cell counter measures a red blood cell count, a white blood cell count, a platelet count, a hemoglobin concentration, a hematocrit value, red blood cell indices, white blood cell classification values, and the like. When a blood-system disease is suspected in particular, a blood cell test using a blood cell counter is performed, and in addition, a smear preparation is made from the sample S, and morphology observation of blood cells is actually performed, to check the presence or absence of a morphological abnormality of cells.

(1) First Parameter Group

In the present embodiment, in step A shown in FIG. 1, in order to obtain a first parameter, with respect to each cell on the smear preparation made from the specimen S1, a morphological feature is extracted from the cell through microscopy or in an image taken by a slide scanner.

For morphological feature extraction, a preparation having been subjected to bright field staining is preferably used. The bright field staining is preferably selected from Wright's staining, Giemsa staining, Wright-Giemsa staining, and May-Giemsa staining. More preferably, the bright field staining is May-Giemsa staining. The preparation may be any preparation that allows individual observation of the morphology of each cell belonging to a predetermined cell group. Examples of the preparation include a smear preparation and an impression preparation. Preferably, the preparation is a smear preparation using peripheral blood or bone marrow aspirate as a sample.

In extraction of a morphological feature from a cell, morphological classification of an individual cell on the preparation is performed. When there is an abnormal finding with respect to a cell, classification of the abnormal finding is performed. Through the morphological classification of the cell, at least one of the type of the cell and the ratio of cells of the same type contained in the sample is obtained as a parameter regarding morphological classification of the cell. Through the classification of the abnormal finding, at least one of the type of the abnormal finding and the ratio of cells exhibiting the abnormal finding of the same type is obtained as a parameter regarding abnormal finding. The first parameter is at least one of the parameter regarding morphological classification and the parameter regarding abnormal finding. The first parameter group is preferably a group of first parameters detected in one observation. FIG. 2 shows an example of the first parameter group.

Examples of the parameter regarding abnormal finding include a value related to at least one selected from nucleus morphology abnormality, granulation abnormality, cell size abnormality, cell malformation, cytoclasis, vacuole, immature cell, presence of inclusion body, Dohle body, satellitism, nucleoreticulum abnormality, petal-like nucleus, increased N/C ratio, bleb-like morphology, smudge, and hairy cell-like morphology.

The nucleus morphology abnormality may include at least one type selected from hypersegmentation, hyposegmentation, pseudo-Pelger anomaly, ring-shaped nucleus, spherical nucleus, elliptical nucleus, apoptosis, polynuclearity, karyorrhexis, enucleation, bare nucleus, irregular nuclear contour, nuclear fragmentation, internuclear bridging, multiple nuclei, cleaved nucleus, nuclear division, and nucleolus abnormality.

The granulation abnormality may include at least one type selected from degranulation, granule distribution abnormality, toxic granule, Auer rod, Fagott cell, and pseudo Chediak-Higashi granule-like granule.

The cell size abnormality may include megathrombocyte.

The parameter regarding morphological classification of each cell may include a value related to at least one of: a value related to the number, for each type, of the cell of at least one type selected from neutrophil, eosinophil, platelet, lymphocyte, monocyte, basophil, metamyelocyte, myelocyte, promyelocyte, blast, plasma cell, atypical lymphocyte, immature eosinophil, immature basophil, erythroblast, and megakaryocyte; and a ratio, for each type, of the cell of at least one type selected from neutrophil, eosinophil, platelet, lymphocyte, monocyte, basophil, metamyelocyte, myelocyte, promyelocyte, blast, plasma cell, atypical lymphocyte, immature eosinophil, immature basophil, erythroblast, and megakaryocyte.

The method for obtaining the first parameter may be any method that can obtain the parameter regarding morphological classification and/or the parameter regarding abnormal finding described above. For example, obtaining of the first parameter may be performed by an examiner, and is preferably performed with use of cell image analysis apparatuses 300, 400 described later.

Obtaining of the first parameter may be performed by using the deep learning algorithm described in US Patent Publication No. 2019-0347467 or the like. US Patent Publication No. 2019-0347467 is incorporated herein. A discriminator that is used in the method of obtaining the first parameter includes a plurality of deep learning algorithms each having a neural network structure, as shown in FIG. 1. The discriminator includes a first deep learning algorithm DL1 and a second deep learning algorithm DL2. The first deep learning algorithm DL1 extracts a feature amount of each cell, and the second deep learning algorithm DL2 discerns the cell being an analysis target, on the basis of the feature amount extracted by the first deep learning algorithm. The second deep learning algorithm DL2 outputs, for each cell, a morphological classification result and a probability that the cell corresponds to the classification, or an abnormal finding classification and a probability that the cell corresponds to the classification. The first deep learning algorithm DL1 is a convolution connect neural network, and the second deep learning algorithm DL2 is a full connect neural network positioned downstream of the first deep learning algorithm.

The preparation to be used for obtaining the first parameter group may be made by subjecting a smear preparation or an impression preparation to bright field staining. The smear preparation or the impression preparation may be made by smearing or pressing a specimen onto a slide glass, and then air-drying the slide glass to fix cells. Cells may be fixed as necessary by a publicly known fixing agent such as an alcohol like methanol or ethanol, formalin, or acetone.

An example of the bright field staining will be described below.

When the bright field staining is Giemsa staining, a fixed slide glass is immersed in a Giemsa staining liquid or a dried slide glass is covered by a Giemsa staining liquid, to be stained for a predetermined time. After the staining, the slide glass is washed by water or the like, and the slide glass is air-dried again. As necessary, the slide glass is cleared by xylene or the like, and then, the observation face of the slide glass is encapsulated by a cover glass and a mounting agent.

When the bright field staining is Wright's staining, a fixed slide glass is immersed in a Wright's staining liquid or a dried slide glass is covered by a Wright's staining liquid, to be stained for a predetermined time. After the staining, the slide glass is washed by a phosphate buffer or the like (e.g., $\frac{1}{15}$ M-phosphate buffer, pH 6.4), and the slide glass is air-dried again. As necessary, the slide glass is cleared by xylene or the like, and then, the observation face of the slide glass is encapsulated by a cover glass and a mounting agent.

When the bright field staining is May-Giemsa staining, a fixed slide glass is first immersed in a May-Grünwald staining liquid or a dried slide glass is covered by a May-Grünwald staining liquid, to be stained for a predetermined time. After the staining, the slide glass is immersed in a phosphate buffer (e.g., $\frac{1}{15}$ M-phosphate buffer, pH 6.4) or the like. Next, the slide glass is immersed in a Giemsa staining liquid or the slide glass is covered by a Giemsa staining liquid, to be stained for a predetermined time. After the staining, the slide glass is washed by water or the like, and the slide glass is air-dried again. As necessary, the slide glass is cleared by xylene or the like, and then, the observation face of the slide glass is encapsulated by a cover glass and a mounting agent.

When the bright field staining is Wright-Giemsa staining, a fixed slide glass is first immersed in a Wright-Giemsa staining liquid or a dried slide glass is covered by a Wright-Giemsa staining liquid, to be stained for a predetermined time. After the staining, the slide glass is immersed in a phosphate buffer (e.g., $\frac{1}{15}$ M-phosphate buffer, pH 6.4), or the like. Next, the slide glass is washed by water or the like, and the slide glass is air-dried again. As necessary, the slide glass is cleared by xylene or the like, and then, the observation face of the slide glass is encapsulated by a cover glass and a mounting agent.

(2) Second Parameter

In the present embodiment, in step B shown in FIG. 1, the specimen S2 is measured by using a blood cell counter to obtain a second parameter.

The second parameter is a parameter obtained on the basis of an optical signal or an electric signal detected by a blood cell counter 350, 450, and is a value related to at least one of: the number, for each type, of the cell; the ratio, for each type, of the cell; the cell size; and the concentration of a component contained in the cell. Obtaining of the second parameter may be performed by using the deep learning algorithm described in US Patent Publication No. 2014-0051071 or the like. US Patent Publication No. 2014-0051071 is incorporated herein.

FIG. 3 shows examples of parameters obtained from the blood cell counter 350, 450.

Preferably, the second parameter is: (i) a value related to the number, for each type, of the cell of at least one type selected from red blood cell, nucleated red blood cell, small red blood cell, platelet, hemoglobin, reticulocyte, immature granulocyte, neutrophil, eosinophil, basophil, lymphocyte, and monocyte; (ii) a value related to the ratio, for each type, of the cell of at least one type selected from red blood cell, nucleated red blood cell, small red blood cell, platelet, hemoglobin, reticulocyte, immature granulocyte, neutrophil, eosinophil, basophil, lymphocyte, and monocyte; and (iii) a value related to at least one selected from hematocrit, mean corpuscular volume (MCV), mean corpuscular hemoglobin (MCH), mean cell hemoglobin concentration (MCHC), and mean platelet volume (MPV). The second parameter may include at least one parameter selected from (i), (ii), and (iii).

(3) Disease Differentiation

In the present embodiment, differentiation support information for supporting disease differentiation is generated on the basis of the first parameter group and the second parameter group.

The disease to be differentiated in the present embodiment may be any disease that is a human disease. Preferably, the disease is a hematopoietic disease. The hematopoietic system disease may include myeloproliferative neoplasms, leukemia, myelodysplastic syndrome, lymphoma, myeloma, and the like. Myeloproliferative neoplasms may preferably include polycythemia vera, essential thrombocythemia, primary myelofibrosis, and the like. Leukemia may preferably include acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphoblastic leukemia, lymphoblastic leukemia, chronic myelogenous leukemia, chronic lymphocytic leukemia, and the like. Lymphoma may include Hodgkin's lymphoma, non-Hodgkin's lymphoma, and the like. Myeloma may include multiple myeloma and the like.

Generation of support information for differentiating diseases is performed by a processing part 20 described later by using a computer algorithm. The computer algorithm may include a machine learning algorithm, a deep learning algorithm, and the like.

The machine learning algorithm may include algorithms such as tree, regression, support vector machine, Bayes, clustering, and random forest. Preferably, the machine learning algorithm is a gradient boosting tree algorithm. Further preferably, the gradient boosting tree is Multimodal deep neural networks (Multimodal DNN).

The deep learning algorithm has a neural network structure.

The computer algorithm is trained according to the following method, and functions as a disease discriminator.

1-2. Generation of Discriminator

Training data is generated by arranging a first parameter group for training and a second parameter group for training as a matrix at the same hierarchical level, and further associating them with a label (hereinafter, also referred to as "disease name label") indicating a disease name. The first parameter group for training is obtained from a training smear preparation. FIG. 4 shows an example of the training data. For example, a first column in FIG. 4 indicates the category of a parameter group. A second column in FIG. 4 indicates the row number. A third column in FIG. 4 indicates the name (label) of each parameter, and a fourth column indicates each parameter. For example, when the parameter is a cell type or a ratio of cells having an abnormal finding, the parameter is represented by a unit of %; when the parameter is a concentration, the parameter is represented by a unit of g/dL, for example; and when the parameter is a cell count, the parameter is represented by a unit of $10^4/\mu L$ ($\times 10^4/\mu L$), or the like. These units are units used in general in blood cell tests and the like. The first parameter is obtained by, using the deep learning algorithm DL2, counting morphological classification results or abnormal finding classification results, and weighting the obtained count result by a probability that the cell corresponds to the classification. For example, when the number of cells classified as neutrophil band cells is 1 out of 100 cells, and the probability that the cell classified as a neutrophil band cell is classified as a neutrophil band cell is 90%, 1 is multiplied by 90%, whereby the number is assumed to be 0.9. A fifth column in FIG. 4 is a label indicating a disease name.

The first parameter group for training and the second parameter group for training are generated for each sample from samples (hereinafter, also referred to as "training sample") collected from patients for whom a definitive diagnosis of a disease name by a doctor has been made. Then, for each sample, a matrix composed of the first parameter group for training and the second parameter group for training is associated with a disease name, whereby training data is generated.

In the example in FIG. 4, the first parameter group for training and the second parameter group for training are arranged in the row direction, but may be arranged in the column direction. Each parameter may be represented by an abbreviation as in FIG. 4 or may be represented by a label value. The disease name label may also be represented by a label value.

Here, the first parameter group for training and the second parameter group for training may be subjected to a predetermined statistical analysis, whereby parameters having a high relevance with a disease may be selected. Examples of the predetermined statistical analysis include one-way analysis of variance (ANOVA), Pearson correlation, Spearman rank correlation, and the like. Preferably, the predetermined statistical analysis is one-way analysis of variance. Through statistical parameter selection, the differentiation accuracy may be enhanced.

Next, the training data is inputted to a computer algorithm, and the computer algorithm is trained, to generate a discriminator. Here, when a machine learning algorithm is used, one algorithm is trained for each disease. Meanwhile, when a deep learning algorithm is used, a single algorithm is sufficient for training with respect to a plurality of diseases.

Training of the computer algorithm may be performed by using software such as Python.

The trained computer algorithm is used for supporting disease differentiation, as a disease discriminator.

1-3. Generation of Analysis Data and Generation of Differentiation Support Information Analysis data is generated by obtaining a first parameter group for analysis and a second parameter group for analysis from an analysis-target sample collected from a subject, and combining these. Preferably, the first parameter group for analysis and the second parameter group for analysis are respectively generated in similar manners to those for the first parameter group for training and the second parameter group for training. In addition, preferably, the parameters included in analysis data are of the same types of the parameters included in the training data. The analysis data is preferably generated by, assuming the first parameter group for analysis and the second parameter group for analysis to be at the same hierarchical level, preferably making them into a matrix in the same order as that of the training data.

Next, the analysis data is inputted to the discriminator trained in 1-2. above, to generate information for supporting disease differentiation. The information is a value indicating a probability, predicted from the analysis data, that the subject has a disease corresponding to the discriminator. Further, on the basis of the probability, a label indicating the disease name of the patient may be outputted.

2. Disease Differentiation Support System 1

An embodiment in the present disclosure relates to a disease differentiation support system 1.

With reference to FIG. 5, a configuration of the disease differentiation support system 1 will be described. The disease differentiation support system 1 includes a training apparatus 100A and a disease differentiation support apparatus 200A. A vendor-side apparatus 100 functions as the training apparatus 100A, and a user-side apparatus 200 operates as the disease differentiation support apparatus 200A.

The training apparatus 100A is connected to the cell image analysis apparatus 300 and the blood cell counter 350. The training apparatus 100A obtains the first parameter group for training from the cell image analysis apparatus 300 and obtains the second parameter group for training from the blood cell counter 350.

The disease differentiation support apparatus 200A is connected to the cell image analysis apparatus 400 and the blood cell counter 450. The disease differentiation support apparatus 200A obtains the first parameter group for analysis from the cell image analysis apparatus 400 and obtains the second parameter group for analysis from the blood cell counter 450.

A storage medium 98 is a computer-readable nonvolatile storage medium such as a DVD-ROM or a USB memory, for example.

In the following, each configuration will be described.

2-1. Cell Image Analysis Apparatus

Figure 6:
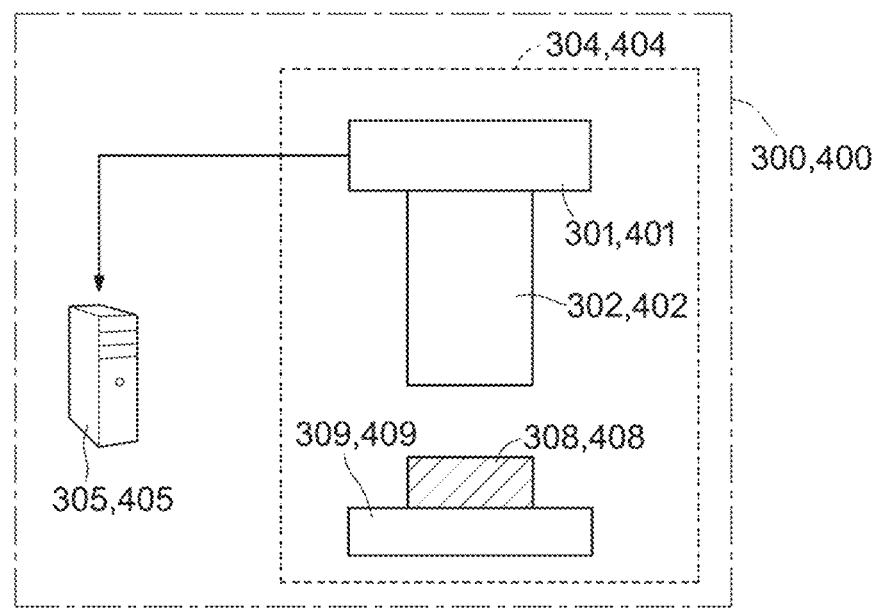
FIG. 6 shows a schematic configuration of a cell image analysis apparatus.

With reference to FIG. 6, a configuration of the cell image analysis apparatus 300 will be described. The cell image analysis apparatus 300 includes an imaging part 304 at least. The imaging part 304 includes a stage 309 for placing a preparation thereon, a magnifier part 302 such as a microscope, and an imaging element 301 for capturing a microscopic image. An image of each cell on the training preparation 308 set on the stage 309 is obtained. The cell image analysis apparatus 300 obtains a first parameter group from the obtained image. The cell image analysis apparatus 300 includes an information processing unit 305. The information processing unit 305 performs obtaining and writing-out of the first parameter group and communication with the training apparatus 100A.

Next, a configuration of the cell image analysis apparatus 400 will be described. The cell image analysis apparatus 400 has basically the same configuration as that of the cell image analysis apparatus 300, and includes an imaging part 404. The imaging part 404 includes a stage 409 for placing a preparation thereon, a magnifier part 402 such as a microscope, and an imaging element 401 for capturing a microscopic image. The cell image analysis apparatus 400 obtains an image of each cell on an analysis preparation 408 set on the stage 409. The cell image analysis apparatus 400 obtains a first parameter group for analysis from the obtained image. The cell image analysis apparatus 400 includes an information processing unit 405. The information processing unit 405 performs obtaining and writing-out of the first parameter group and communication with the disease differentiation support apparatus 200A.

As the cell image analysis apparatuses 300, 400, Automated Digital Cell Morphology Analyzer DI-60 manufactured by SYSMEX corporation, or the like may be used, for example.

2-2. Blood Cell Counter

A configuration of the blood cell counter 350 will be described with reference to FIG. 7 and FIG. 8. The blood cell counter 350 is a flow cytometer or the like that includes an optical detector 411 for detecting an optical signal and having a flow cell shown in FIG. 7.

Figure 7:
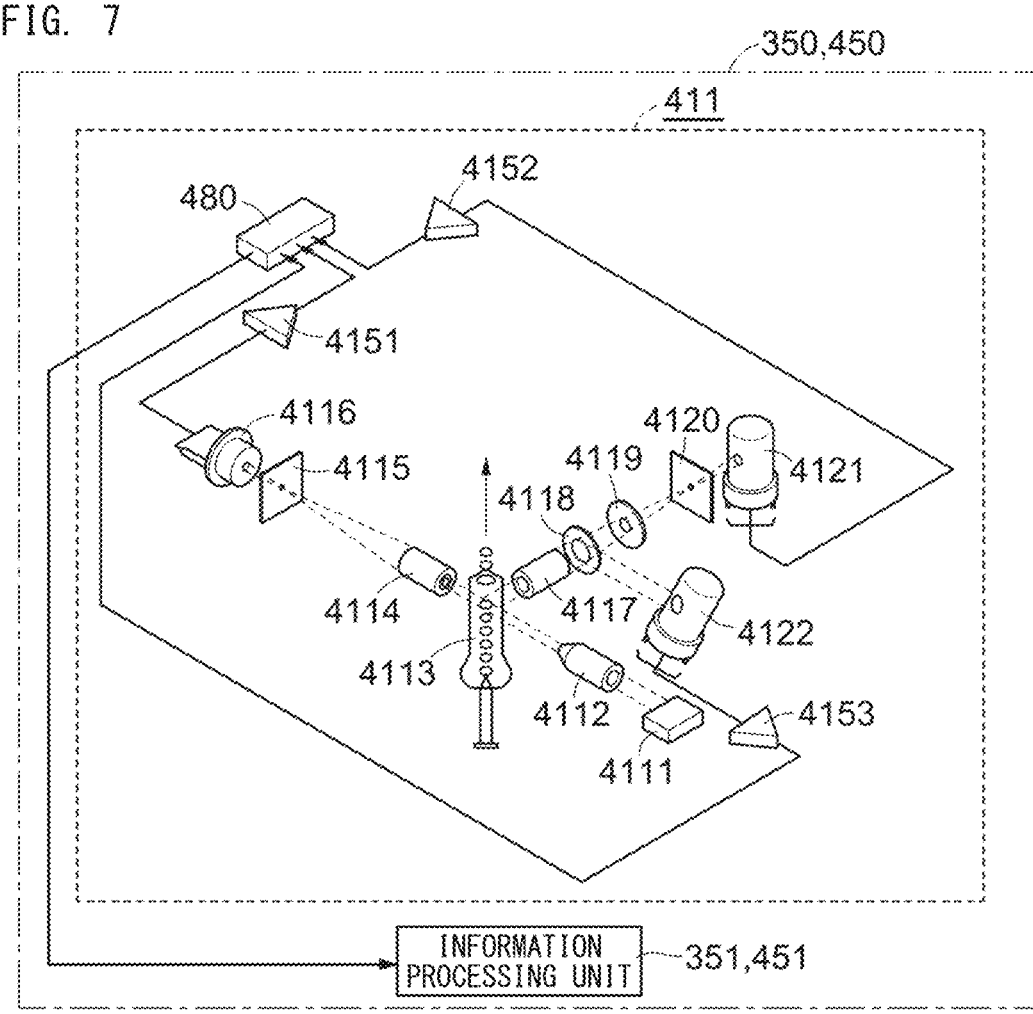
FIG. 7 shows a configuration example of a blood cell counter including an optical detector.

In FIG. 7, light emitted from a laser diode being a light source 4111 is applied via a light application lens system 4112 to each cell passing through a flow cell 4113.

In the present embodiment, the light source 4111 of the flow cytometer is not limited in particular, and a light source 4111 that has a wavelength suitable for excitation of a fluorescent dye is selected. As such a light source 4111, a semiconductor laser including a red semiconductor laser and/or a blue semiconductor laser, a gas laser such as an argon laser or a helium-neon laser, a mercury arc lamp, or the like is used, for example. In particular, a semiconductor laser is suitable because the semiconductor laser is very inexpensive when compared with a gas laser.

As shown in FIG. 7, forward scattered light emitted from the particle passing through the flow cell 4113 is received by a forward scattered light receiving element 4116 via a condenser lens 4114 and a pinhole part 4115. The forward scattered light receiving element 4116 may be a photodiode or the like. Side scattered light is received by a side scattered light receiving element 4121 via a condenser lens 4117, a dichroic mirror 4118, a bandpass filter 4119, and a pinhole part 4120. The side scattered light receiving element 4121 may be a photodiode, a photomultiplier, or the like. Side fluorescence is received by a side fluorescence receiving element 4122 via the condenser lens 4117 and the dichroic mirror 4118. The side fluorescence receiving element 4122 may be an avalanche photodiode, a photomultiplier, or the like.

Reception light signals outputted from the respective light receiving elements 4116, 4121, and 4122 are subjected to analogue processing such as amplification and waveform processing by an analogue processing part having amplifiers 4151, 4152, 4153, and are sent to a measurement unit controller 480.

The measurement unit controller 480 is connected to an information processing unit 351. The information processing unit 351 obtains a second parameter on the basis of the optical signals obtained in the optical detector 411.

Figure 8:
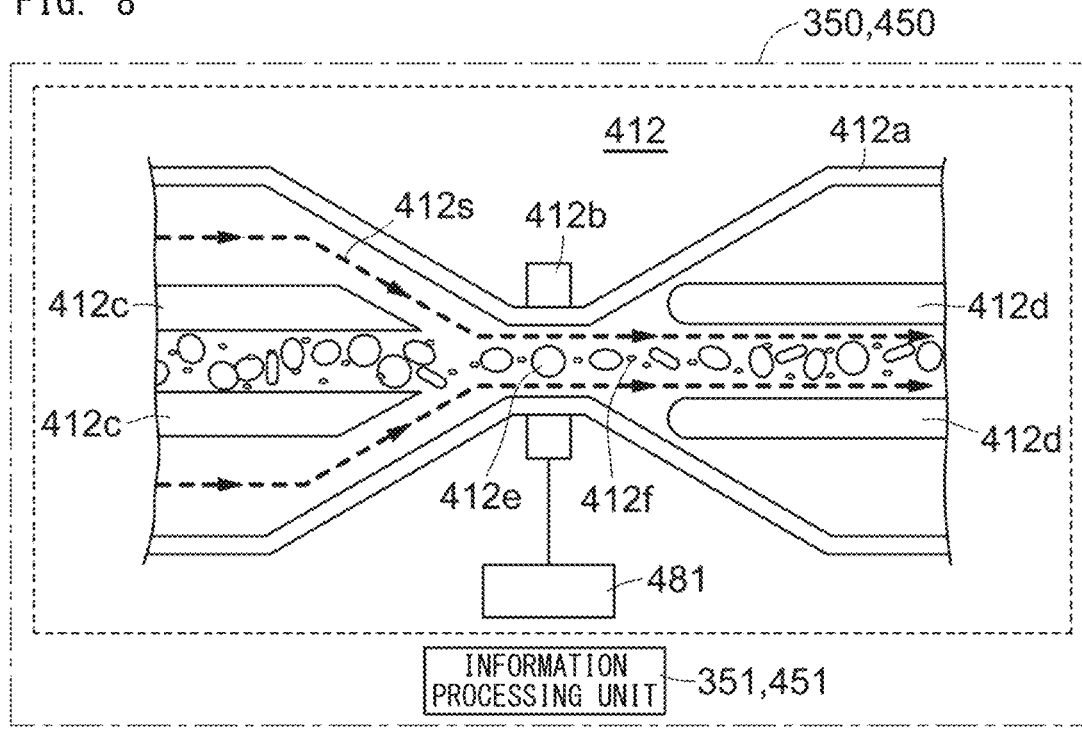
FIG. 8 shows a configuration example of a blood cell counter including an electric resistance-type detector.

The blood cell counter 350 may include an electric resistance-type detector 412 shown in FIG. 8. FIG. 8 shows a case where the electric resistance-type detector 412 is a sheath flow-type electric resistance detector 412. The sheath flow-type electric resistance detector 412 includes: a chamber wall 412a; an aperture portion 412b for measuring an electric resistance of a cell; a sample nozzle 412c which supplies a sample; and a collection tube 412d which collects cells having passed through the aperture portion 412b. The space around the sample nozzle 412c and the collection tube 412d in the chamber wall 412a is filled with a sheath liquid. Dashed line arrows indicated by the reference character 412s show the direction in which the sheath liquid flows. A red blood cell 412e and a platelet 412f discharged from the sample nozzle pass through the aperture portion 412b while being enveloped by the flow 412s of the sheath liquid. A constant DC voltage is applied to the aperture portion 412b, and control is performed such that a constant current flows while only the sheath liquid is flowing. A cell is less likely to allow electricity to pass therethrough, i.e., has a large electric resistance. Therefore, when a cell passes through the aperture portion 412b, the electric resistance changes. Thus, at the aperture portion 412b, the number of times of passage of cells and the electric resistance at those times may be detected. Since the electric resistance increases in proportion to the volume of a cell, a measurement unit information processing part 481 may calculate the volume of a cell having passed through the aperture portion 412b from the signal intensity regarding the electric resistance value, and may send a histogram of the count number of cells for each volume, to the information processing unit 351.

The blood cell counter 350 measures a training sample, to obtain a second parameter group for training.

The configuration of the blood cell counter 450 is similar to that of the blood cell counter 350. The blood cell counter 450 measures a training sample to obtain a second parameter group for analysis.

An example of the blood cell counters 350, 450 is a blood cell counter XN-2000 manufactured by SYSMEX corporation, for example.

2-3. Training Apparatus

The training apparatus 100A trains a computer algorithm by using, as training data, the first parameter group for training and the second parameter group for training and a disease name associated therewith, to generate a discriminator. The training apparatus 100A obtains each first parameter from the cell image analysis apparatus 300 through a storage medium 98 or a network 99. The training apparatus 100A obtains each second parameter from the blood cell counter 350 through a storage medium 98 or the network 99. The training apparatus 100A provides the generated discriminator to the disease differentiation support apparatus 200A. The discriminator is provided through a storage medium 98 or the network 99. The disease differentiation support apparatus 200A generates differentiation support information for supporting disease differentiation, by using the discriminator.

(1) Hardware Configuration of Training Apparatus

Figure 9:
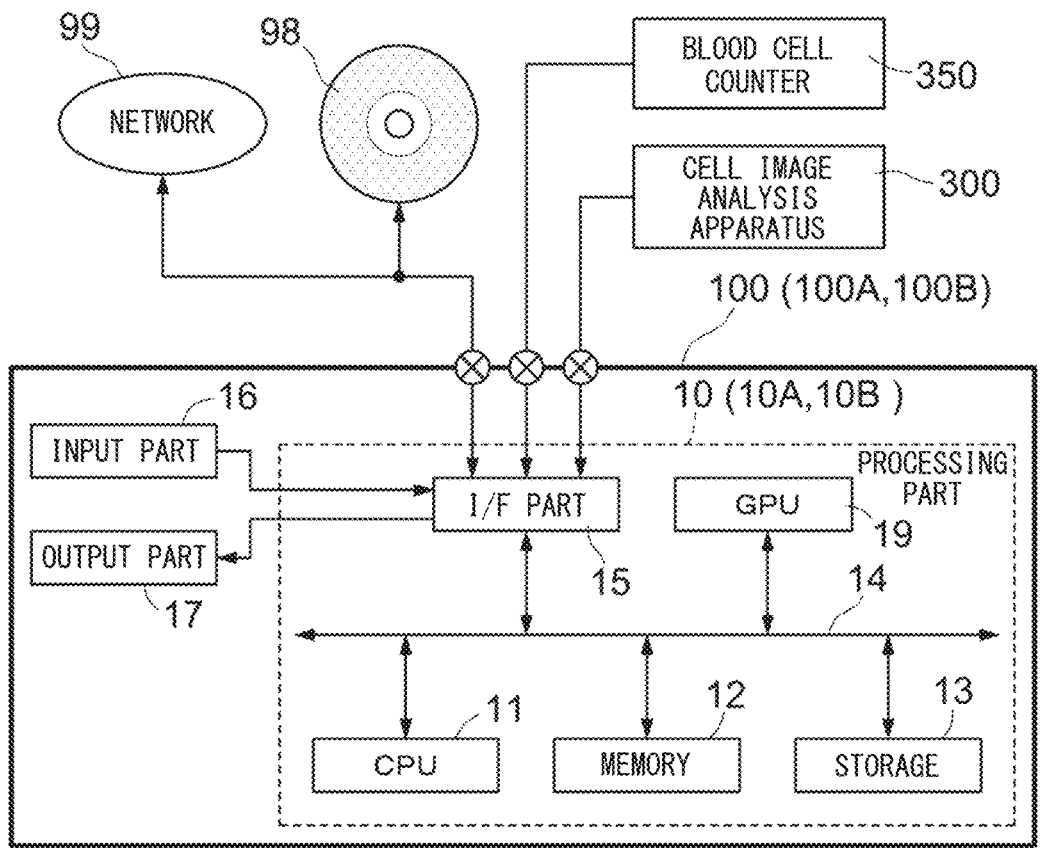
FIG. 9 shows a hardware configuration of a training apparatus 100A and a disease differentiation support apparatus 100B.

With reference to FIG. 9, a configuration of hardware of the training apparatus 100A will be described. The training apparatus 100A includes a processing part 10 (10A), an input part 16, and an output part 17. The training apparatus 100A is implemented as a general-purpose computer, for example.

The processing part 10 includes a CPU (Central Processing Unit) 11 which performs data processing described later; a memory 12 to be used as a work area for data processing; a storage 13 which stores therein a program and processing data described later; a bus 14 which transmits data between parts; an interface part 15 which inputs/outputs data to/from an external apparatus; and a GPU (Graphics Processing Unit) 19. The input part 16 and the output part 17 are connected to the processing part 10. For example, the input part 16 is an input device such as a keyboard, a touch panel, or a mouse, and the output part 17 is a display device such as a liquid crystal display. The GPU 19 functions as an accelerator that assists arithmetic processing (e.g., parallel arithmetic processing) performed by the CPU 11. That is, in the following description, processing performed by the CPU 11 means to include processing performed by the CPU 11 while using the GPU 19 as an accelerator.

The processing part 10 has previously stored, in the storage 13 and, for example, in an executable form, a computer algorithm and a computer program for performing a training process described in FIG. 11 below. The executable form is a form generated through conversion of a programming language by a compiler, for example. The processing part 10 performs a training process of the computer algorithm by using the computer program (hereinafter, simply referred to as "training program" sometimes) for performing the training process, in cooperation with an operation system stored in the storage 13.

In following description, unless otherwise specified, processing performed by the processing part 10 means processing performed by the CPU 11 on the basis of the computer algorithm and the computer program for performing the training process stored in the storage 13 or the memory 12. The CPU 11 temporarily stores, in a volatile manner, necessary data (such as intermediate data being processed) using the memory 12 as a work area, and stores, as appropriate in a nonvolatile manner, data to be saved for a long time such as arithmetic results, into the storage 13.

(2) Function Configuration of Training Apparatus

Figure 10:
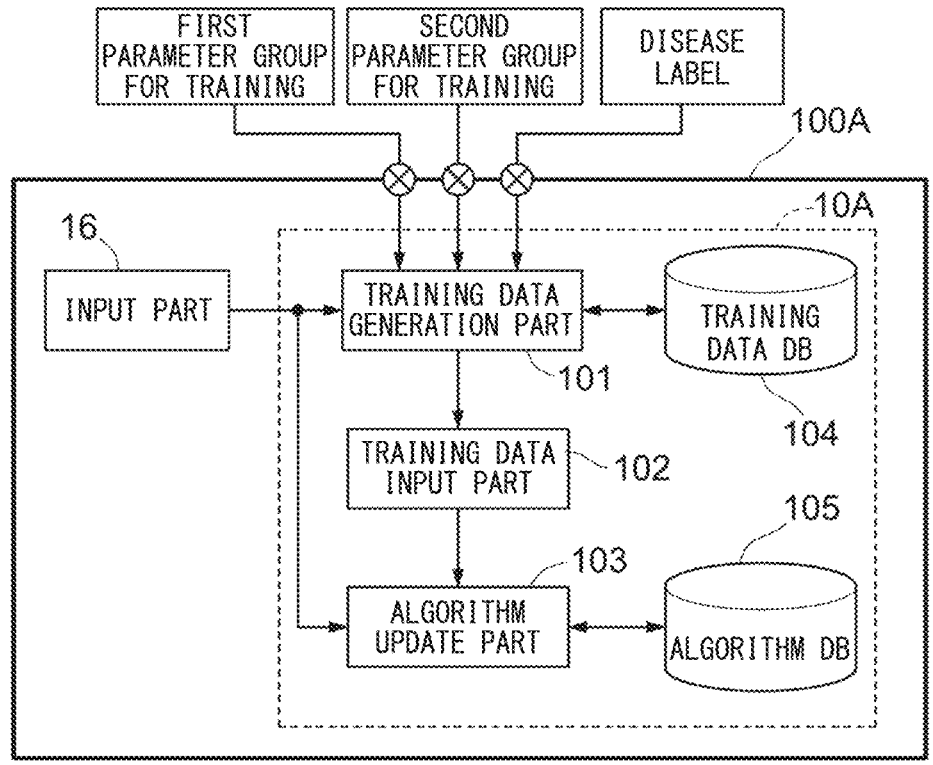
FIG. 10 shows a function configuration example of the training apparatus 100A.

With reference to FIG. 10, the processing part 10A of the training apparatus 100A functions as a training data generation part 101, a training data input part 102, and an algorithm update part 103. These functions are realized when: a training program (e.g., Python) for causing a computer to execute the training process is installed in the storage 13 or the memory 12 of the processing part 10A; and the program is executed by the CPU 11. A training data database (DB) 104 stores therein the first parameter group for training obtained by the processing part 10A from the cell image analysis apparatus 300 and the second parameter group for training obtained by the processing part 10A from the blood cell counter 350. In addition, the training data DB 104 stores therein the disease name label corresponding to the parameters. An algorithm database (DB) 105 may store therein a computer algorithm before being trained, and the computer algorithm after being trained.

The training data generation part 101 corresponds to step S11 described later, the training data input part 102 corresponds to step S12, and the algorithm update part 103 corresponds to step S15.

(3) Process of Training Program

Figure 11:
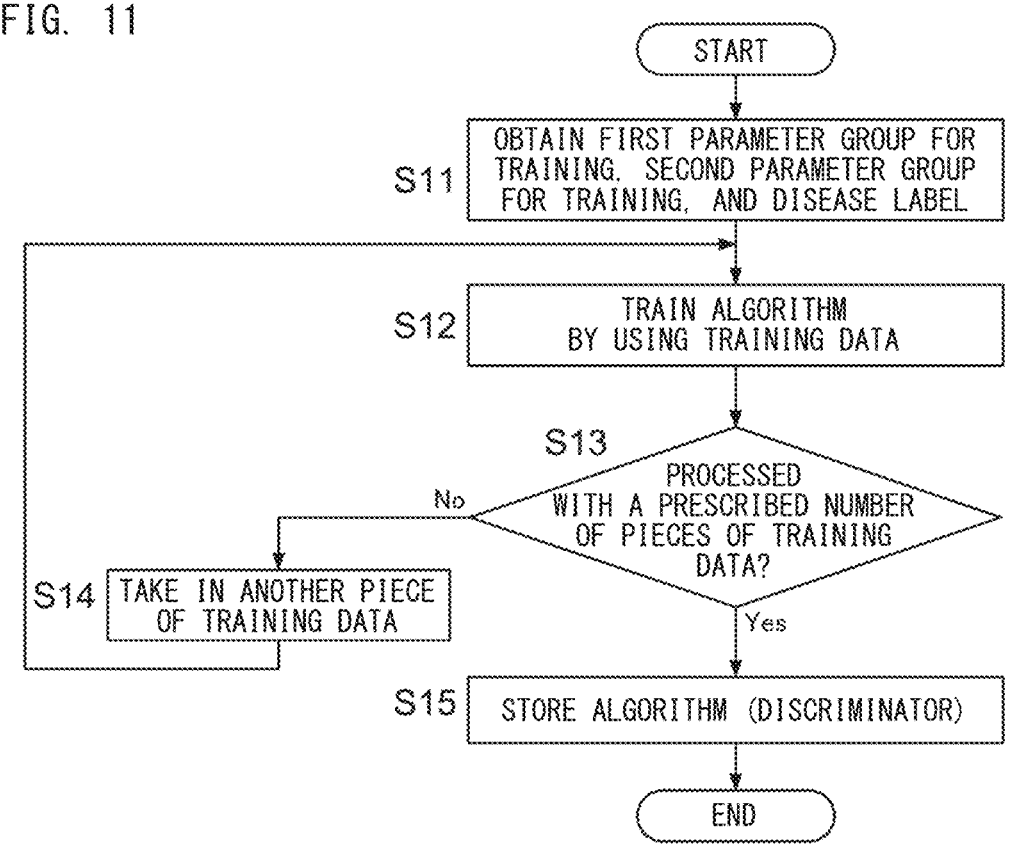
FIG. 11 shows a flow of a process of a training program.

The processing part 10A of the training apparatus 100A executes each step of the training program shown in FIG. 11.

Upon receiving a training data obtaining process start instruction inputted by an operator through the input part 16, the processing part 10A obtains the first parameter group for training from the cell image analysis apparatus 300 and stores the first parameter group for training into the training data DB 104 in the storage 13, in step S11. Further, the processing part 10A obtains the second parameter group for training from the blood cell counter 350, and stores the second parameter group for training into the training data DB 104 in the storage 13. In accordance with the method described in 1-2. above, the processing part 10A generates training data such that the first parameter group for training and the second parameter group for training are associated with a disease name label, and stores the training data into the training data database 104 in the storage 13. The disease name label corresponding to each parameter group may be associated with the first parameter group for training and the second parameter group for training, by receiving a disease name label inputted for each parameter group by the operator through the input part 16. Alternatively, when the cell image analysis apparatus 300 or the blood cell counter 350 has obtained each parameter, patient information and each parameter may be associated with each other, and this information may be read by the processing part 10A.

The processing part 10A receives a training process start instruction inputted by the operator through the input part 16, then, in step S12, reads out the computer algorithm stored in the algorithm DB 105 in the storage 13, further reads out the training data from the training data DB 104, and inputs the training data to the computer algorithm.

In step S13, the processing part 10A determines whether the computer algorithm has been trained by using all of the training data. When the computer algorithm has not been trained by using all of the training data (when "No"), the processing part 10A proceeds to step S14, reads out the next training data from the training data DB 104, returns to step S12, and continues the process.

In step S13, when the computer algorithm has been trained by using all of the training data (when "Yes"), the processing part 10A proceeds to step S15, and stores the trained computer algorithm into the algorithm DB 105 in the storage 13.

The trained computer algorithm functions as a discriminator for generating differentiation support information for supporting disease differentiation.

2-4. Disease Differentiation Support Apparatus

The disease differentiation support apparatus 200A obtains the first parameter group for analysis, the second parameter group for analysis, and the discriminator, and generates differentiation support information for supporting disease differentiation. The disease differentiation support apparatus 200A obtains each first parameter for analysis from the cell image analysis apparatus 400 through a storage medium 98 or the network 99. The disease differentiation support apparatus 200A obtains each second parameter for analysis from the blood cell counter 450 through a storage medium 98 or the network 99.

(1) Hardware Configuration of Disease Differentiation Support Apparatus

Figure 12:
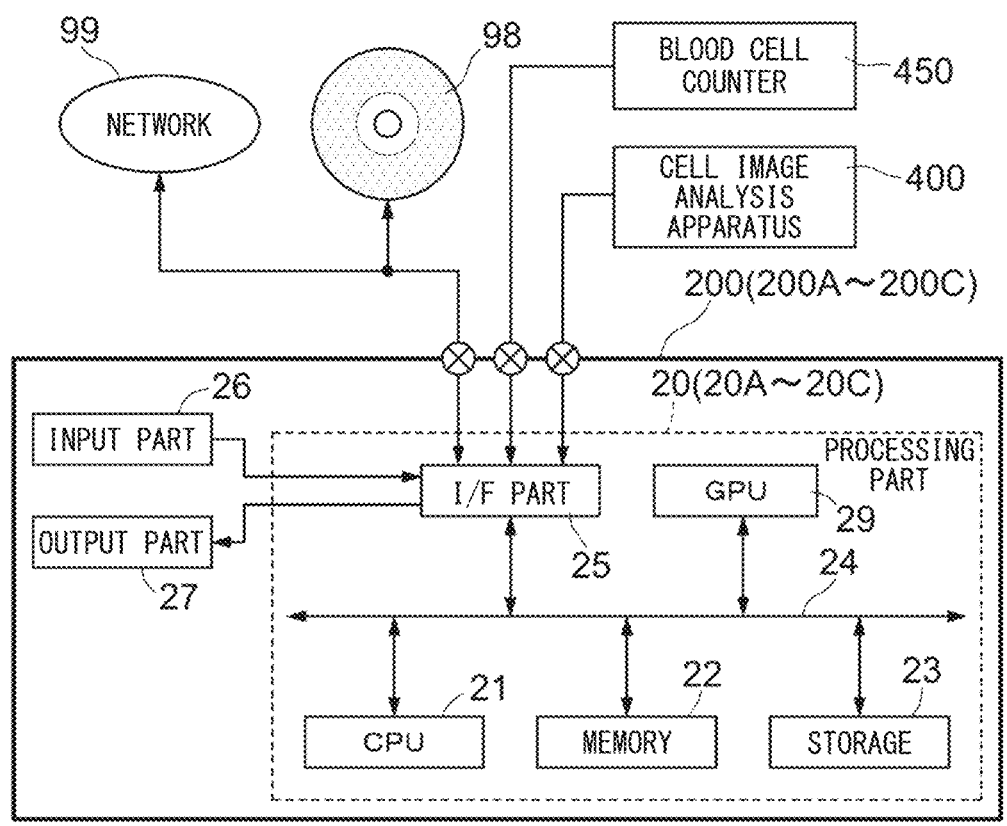
FIG. 12 shows a hardware configuration of disease differentiation support apparatuses 200A, 200B, and a terminal apparatus 200C.

With reference to FIG. 12, a configuration of hardware of the disease differentiation support apparatus 200A will be described. The configuration of the disease differentiation support apparatus 200A is basically similar to that of the training apparatus 100A. However, the processing part 10 (10A), the input part 16, and the output part 17 of the training apparatus 100A are replaced, in the disease differentiation support apparatus 200A, with a processing part 20 (20A), an input part 26, and an output part 27, respectively.

In addition, the CPU 11, the memory 12, the storage 13, the bus 14, the interface part 15, and the GPU 19 of the training apparatus 100A are replaced, in the disease differentiation support apparatus 200A, with a CPU 21, a memory 22, a storage 23, a bus 24, an interface part 25, and a GPU 29, respectively.

The processing part 20 has previously stored, in the storage 23 and, for example, in an executable form, a computer program for performing the process of each step described in FIG. 14 below. The executable form is a form generated through conversion of a programming language by a compiler, for example. The processing part 20 generates differentiation support information for supporting disease differentiation, by using the computer program for supporting disease differentiation stored in the storage 23 and the discriminator generated by the training apparatus 100A.

In addition, the processing part 20 has previously stored, in the storage 23 and, for example, in an executable form, the discriminator and the computer program for supporting disease differentiation described later in order to perform the process of each step described in a disease analysis process below. The executable form is a form generated through conversion of a programming language by a compiler, for example. The processing part 20 performs a generation process of differentiation support information for supporting disease differentiation, by using the discriminator and the program for supporting disease differentiation, in cooperation with an operation system stored in the storage 23.

In following description, unless otherwise specified, processing performed by the processing part 20 means, in actuality, processing performed by the CPU 21 of the processing part 20 on the basis of the discriminator and the computer program for supporting disease differentiation stored in the storage 23 or the memory 22. The CPU 21 temporarily stores, in a volatile manner, necessary data (such as intermediate data being processed) using the memory 22 as a work area, and stores, as appropriate in a nonvolatile manner, data to be saved for a long time such as arithmetic results, into the storage 23.

(2) Function Configuration of Disease Differentiation Support Apparatus

Figure 13:
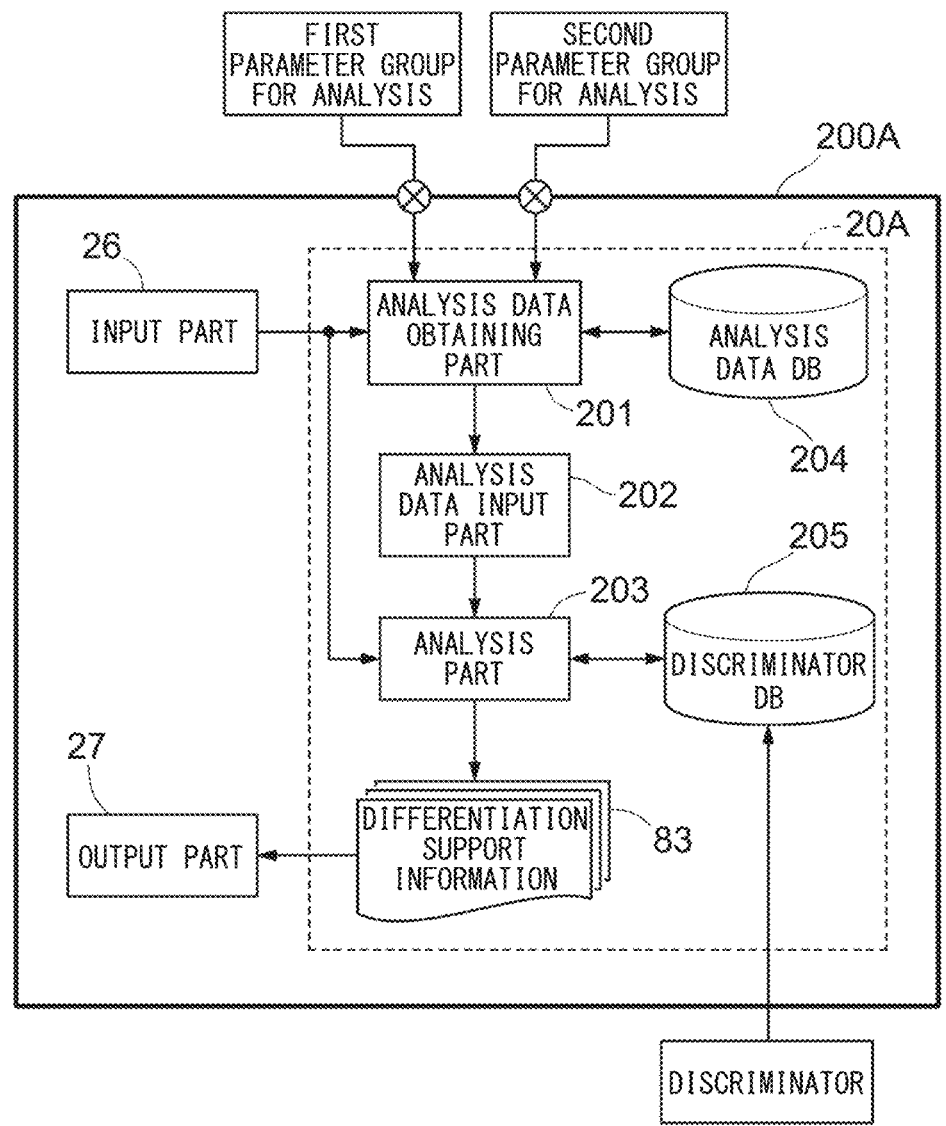
FIG. 13 shows a function configuration example of the disease differentiation support apparatus 200A.

With reference to FIG. 13, the processing part 20A of the disease differentiation support apparatus 200A functions as an analysis data obtaining part 201, an analysis data input part 202, an analysis part 203, an analysis data database (DB) 204, and a discriminator database (DB) 205. These functions are realized when: a computer program (e.g., Python) for causing a computer to execute the generation process of differentiation support information is installed in the storage 23 or the memory 22 of the processing part 20A; and this computer program and the computer program for supporting disease differentiation including a discriminator are executed by the CPU 21. An analysis data database (DB) 204 stores therein the first parameter group for analysis obtained by the processing part 20A from the cell image analysis apparatus 400 and the second parameter group for analysis obtained by the processing part 20A from the blood cell counter 450. The discriminator database (DB) 205 stores therein the discriminator obtained from the training apparatus 100A.

The analysis data obtaining part 201 corresponds to step S21 described later, the analysis data input part 202 corresponds to step S22 and step S23, and the analysis part 203 corresponds to step S24.

(3) Process of Computer Program for Supporting Disease Differentiation

Figure 14:
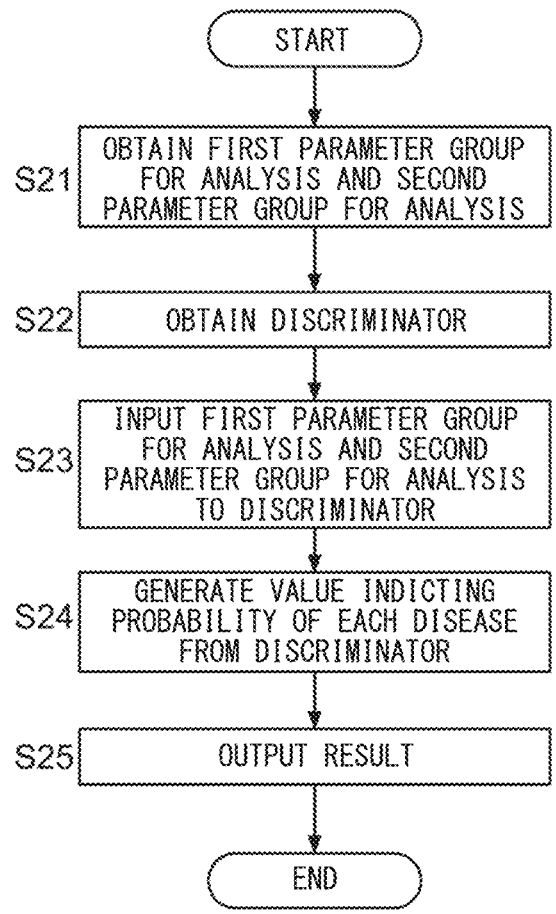
FIG. 14 shows a flow of a process of a computer program for supporting disease differentiation.

The processing part 20A of the disease differentiation support apparatus 200A executes each step shown in FIG. 14.

Upon receiving an analysis data obtaining process start instruction inputted by the operator through the input part 26, the processing part 20A obtains the first parameter group for analysis from the cell image analysis apparatus 400 and stores the first parameter group for analysis into the analysis data DB 204 in the storage 23. Further, the processing part 20A obtains the second parameter group for analysis from the blood cell counter 450, and stores the second parameter group for analysis into the analysis data DB 204 in the storage 23.

The processing part 20A receives a discriminator obtaining process start instruction inputted by the operator through the input part 26, and, in step S22, obtains the discriminator from the training apparatus 100A. Alternatively, when the discriminator is stored in advance in the discriminator database 205 in the storage 23, the processing part 20A reads out the stored discriminator.

The processing part 20A receives an analysis process start instruction inputted by the operator through the input part 26, then, in step S23, retrieves from the analysis data DB 204 the first parameter group for analysis and the second parameter group for analysis obtained in step S21, and inputs the first parameter group for analysis and the second parameter group for analysis to the discriminator.

In step S24, the processing part 20A generates a value indicating a probability of each disease, as differentiation support information for supporting disease differentiation, and stores the value into the storage 23.

In step S25, the processing part 20A outputs the result generated in step S24, to the output part 27.

3. Disease Differentiation Support System 2

Figure 15:
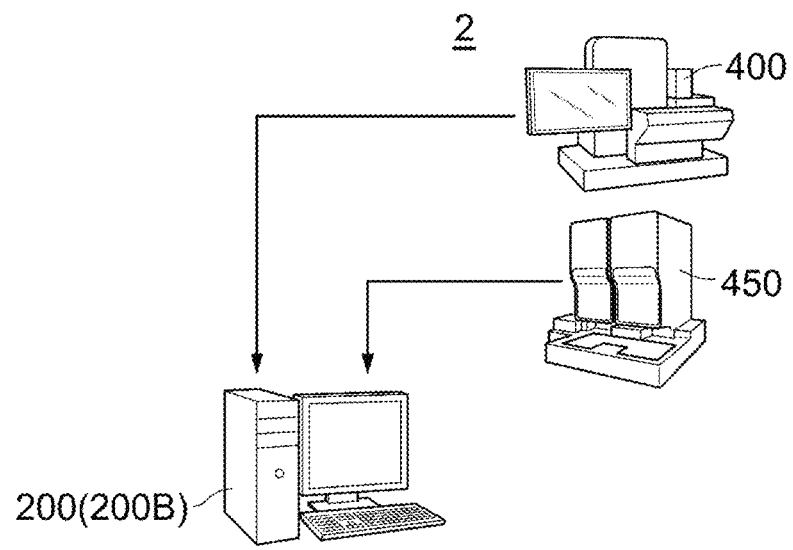
FIG. 15 shows a configuration example of a disease differentiation support system 2.
Figure 16:
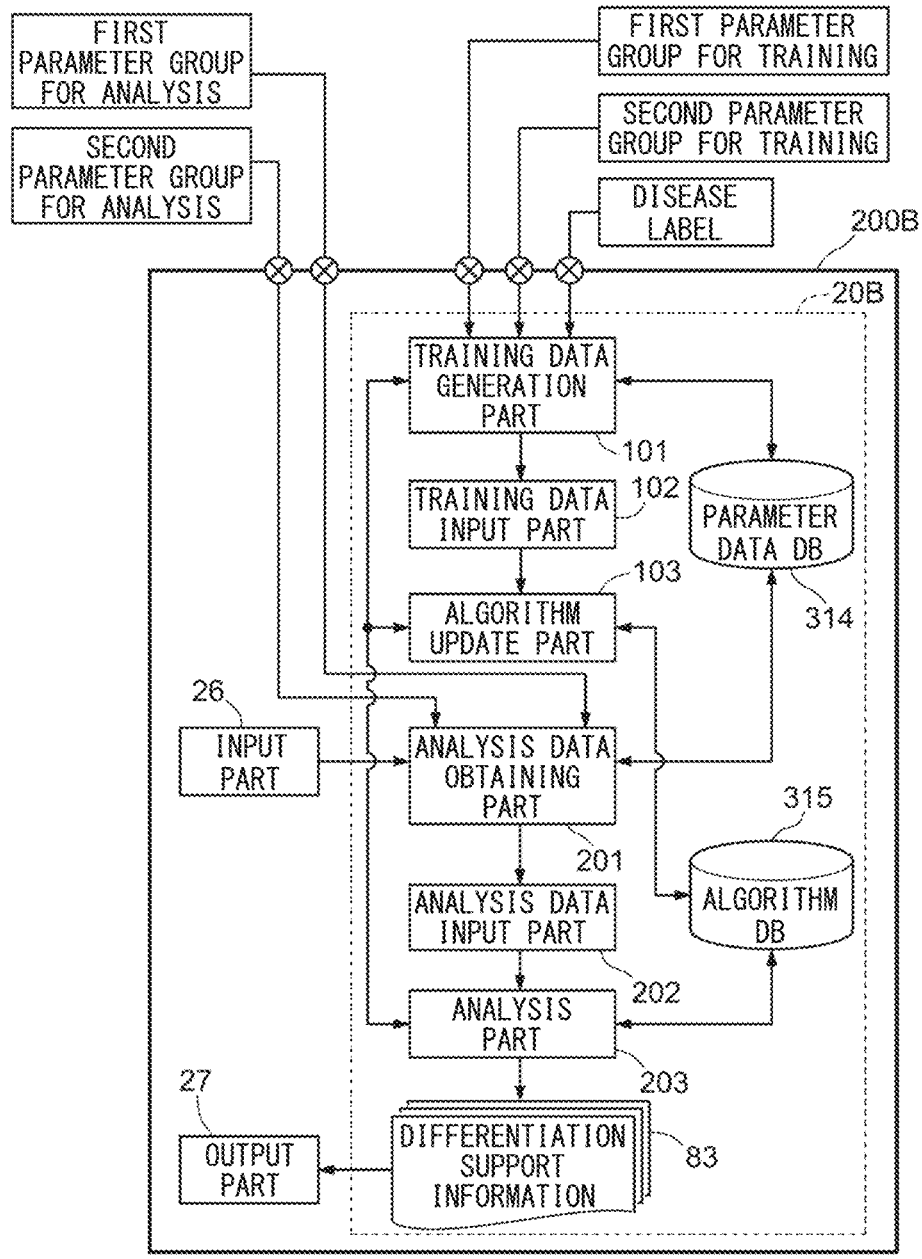
FIG. 16 shows a function configuration example of the disease differentiation support apparatus 200B.

With reference to FIG. 15 and FIG. 16, another aspect of the disease differentiation support system will be described. FIG. 15 shows a configuration example of a disease differentiation support system 2. The disease differentiation support system 2 includes the user-side apparatus 200, the cell image analysis apparatus 400, and the blood cell counter 450, and the user-side apparatus 200 operates as a disease differentiation support apparatus 200B which performs both of training and disease differentiation support. The disease differentiation support apparatus 200B has both functions of the training apparatus 100A and the disease differentiation support apparatus 200A. The disease differentiation support apparatus 200B is connected to the cell image analysis apparatus 400 and the blood cell counter 450.

(1) Hardware Configuration of Disease Differentiation Support Apparatus 200B

The hardware configuration of the disease differentiation support apparatus 200B is similar to the hardware configuration of the user-side apparatus 200 shown in FIG. 12. In the disease differentiation support apparatus 200B, the processing part 20A in FIG. 12 is replaced with a processing part 20B.

(2) Function Configuration of Disease Differentiation Support Apparatus 200B

FIG. 16 shows a function configuration of the disease differentiation support apparatus 200B. The processing part 20B of the disease differentiation support apparatus 200B functions as the training data generation part 101, the training data input part 102, the algorithm update part 103, the analysis data obtaining part 201, the analysis data input part 202, the analysis part 203, a parameter database (DB) 314, and an algorithm database (DB) 315. The parameter database (DB) 314 has both of the function of the training data DB 104 described in 2-3.(2) above, and the function of the analysis data DB 204 described 2-4.(2) above. The algorithm database (DB) 315 has both of the function of the algorithm DB 105 described in 2-3.(2) above, and the function of the discriminator DB 205 described in 2-4.(2) above. That is, the parameter DB 314 stores therein: the first parameter group for training and the first parameter group for analysis obtained by the processing part 20B from the cell image analysis apparatus 400; and the second parameter group for training and the second parameter group for analysis obtained by the processing part 20B from the blood cell counter 450. The algorithm DB 315 stores therein a computer algorithm before being trained, and a discriminator being the computer algorithm after being trained.

The processing part 20B of the disease differentiation support apparatus 200B performs the processes shown in 2-3.(3) above and FIG. 11 during training. The training data generation part 101 corresponds to step S11, the training data input part 102 corresponds to step S12, and the algorithm update part 103 corresponds to step S15, the steps being described in 2-3.(3) above. Here, "the storage 13 of the processing part 10A", "the training data DB 104", and "the algorithm DB 105" described in 2-3.(3) above are replaced with "the storage 23 of the processing part 20B", "the parameter DB 314", and "the algorithm DB 315", respectively.

The processing part 20B of the disease differentiation support apparatus 200B performs processes shown in 2-4.(3) above and FIG. 14 during the generation process of differentiation support information. The analysis data obtaining part 201 corresponds to step S21, the analysis data input part 202 corresponds to step S22 and step S23, and the analysis part 203 corresponds to step S24, the steps being described in 2-4.(3) above. Here, "the analysis data DB 204" and "the discriminator DB 205" described in 2-4.(3) above are replaced with "the parameter DB 314" and "the algorithm DB 315", respectively.

4. Disease Differentiation Support System 3

Figure 17:
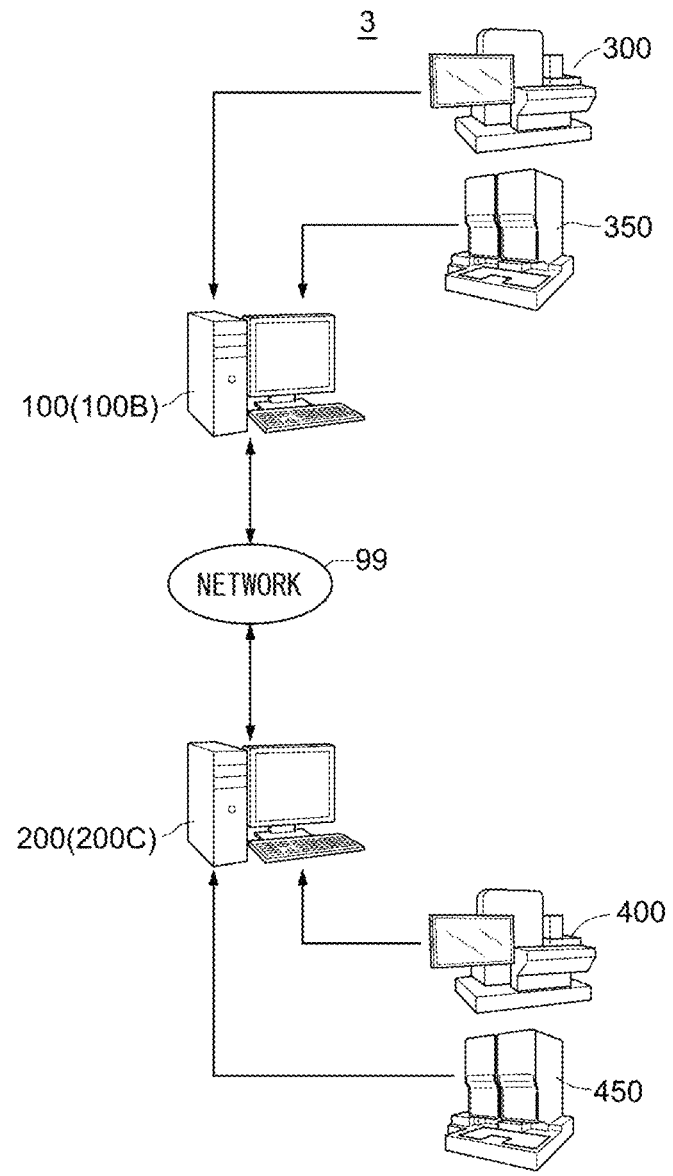
FIG. 17 shows a configuration example of a disease differentiation support system 3.
Figure 18:
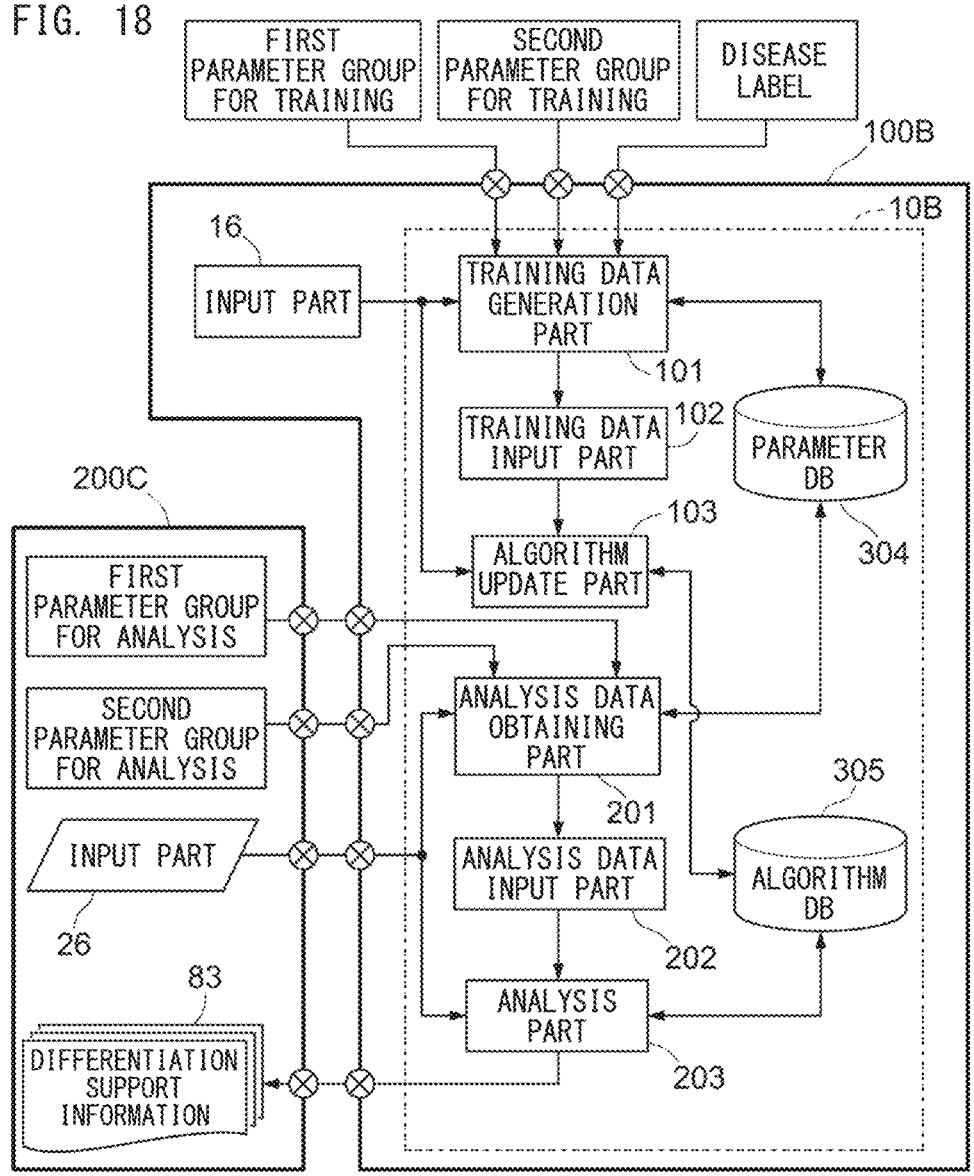
FIG. 18 shows a function configuration example of the disease differentiation support apparatus 100B.

With reference to FIG. 17 and FIG. 18, another aspect of the disease differentiation support system will be described. FIG. 17 shows a configuration example of a disease differentiation support system 3. The disease differentiation support system 3 includes the vendor-side apparatus 100 and the user-side apparatus 200. The vendor-side apparatus 100 includes the processing part 10 (10B), the input part 16, and the output part 17. Similar to the disease differentiation support apparatus 200B above, the vendor-side apparatus 100 operates as a disease differentiation support apparatus 100B which performs both of the training process and a differentiation support information generation process. Meanwhile, the user-side apparatus 200 operates as a terminal apparatus 200C.

Here, the disease differentiation support apparatus 100B is an apparatus on the cloud server side implemented as a general-purpose computer or the like, for example. The disease differentiation support apparatus 100B is communicably connected to the cell image analysis apparatus 300 and the blood cell counter 350. In addition, the disease differentiation support apparatus 100B is communicably connected to the terminal apparatus 200C through the network 99.

The terminal apparatus 200C is a general-purpose computer or the like, and is communicably connected to the cell image analysis apparatus 400 and the blood cell counter 450.

(1) Hardware Configuration of Disease Differentiation Support Apparatus 100B

The hardware configuration of the disease differentiation support apparatus 100B is similar to the hardware configuration of the vendor-side apparatus 100 shown in FIG. 10. In the disease differentiation support apparatus 100B, the processing part 10A in FIG. 10 is replaced with the processing part 10B.

(2) Function Configuration of Disease Differentiation Support System 3

FIG. 18 shows a function configuration of the disease differentiation support system 3. The function configuration of the disease differentiation support apparatus 100B is similar to that described in 3.(2) above and FIG. 16.

The terminal apparatus 200C obtains each first parameter for analysis from the cell image analysis apparatus 400, obtains each second parameter for analysis from the blood cell counter 450, and transmits these analysis parameters to the disease differentiation support apparatus 100B through the network 99. The disease differentiation support apparatus 100B generates differentiation support information from the analysis parameters transmitted from the terminal apparatus 200C, and transmits the differentiation support information to the terminal apparatus 200C.

5. Computer Program

Another embodiment of the present disclosure relates to a computer program that causes a computer to execute the training process including steps S11 to S15 shown in 2-3.(3) above and FIG. 11.

Another embodiment of the present disclosure relates to a computer program that causes a computer to execute the process for supporting disease differentiation including steps S21 to S25 shown in 2-4.(3) above and FIG. 14.

The computer program may be provided as a program product such as a storage medium having stored therein the computer program. The computer program is stored in a storage medium such as a hard disk, a semiconductor memory element such as a flash memory, or an optical disk. The storage form of the program in the storage medium is not limited as long as the processing part may read the program. Preferably, the program is stored in the storage medium in a nonvolatile manner.

6. Treatment Strategy

A treatment strategy of the present embodiment includes a step of treating a subject on the basis of the disease name label provided to the subject, in addition to the steps described in "support method" in 1. above. Preferably, in a treatment step, a drug according to the disease of the subject is administrated, to treat the subject.

To a subject provided with a label indicating polycythemia vera, aspirin, hydroxyurea, interferon α, or the like may be administrated.

To a subject provided with a label indicating essential thrombocythemia, aspirin, hydroxycarbamide, anagrelide, or the like may be administrated.

To a subject provided with a label indicating primary myelofibrosis, thalidomide such as lenalidomide; or danazol may be administrated, for example.

To a subject provided with a label indicating myelodysplastic syndrome, azacytidine administration; decitabine administration; combined administration of decitabine and cedazuridine; administration of thalidomide such as lenalidomide; or the like may be performed.

To a subject provided with a label indicating acute myeloblastic leukemia, cytarabine (or enocitabine) administration; enocitabine administration; combined administration of all-trans-type retinoic acid and 6-mercaptopurine methotrexate; azacytidine administration; administration of thalidomide such as lenalidomide hydrate; or the like may be performed.

To a subject provided with a label indicating acute promyelocytic leukemia or acute myeloid leukemia, cytarabine (or enocitabine) administration; enocitabine administration; daunorubicin administration; idarubicin administration; mitoxantrone administration; combined administration of all-trans-type retinoic acid and tamibarotene; gemtuzumab ozogamicin administration; or the like may be performed.

To a subject provided with a label indicating acute myelomonocytic leukemia or acute monocytic leukemia, combined administration of cytarabine (or enocitabine) and an anthracycline-based anticancer agent (daunorubicin, idarubicin, mitoxantrone, or the like); all-trans-type retinoic acid administration; combined administration of arsenic trioxide and all-trans-type retinoic acid; or the like may be performed.

To a subject provided with a label indicating erythroleukemia, azacytidine administration or the like may be performed.

To a subject provided with a label indicating acute megakaryoblastic leukemia, etoposide; cytarabine (or enocitabine) administration; combined administration of cytosine arabinoside and daunomycin; or the like may be performed.

To a subject provided with a label indicating acute lymphoblastic leukemia or lymphoblastic leukemia, thalidomide such as lenalidomide hydrate, enocitabine, vincristine, prednisolone, doxorubicin, L-asparaginase, or a combination of these may be administered, as an example.

To a subject provided with a label indicating chronic myelogenous leukemia, imatinib, nilotinib, dasatinib, bosutinib, ponatinib, hydroxycarbamide, or a combination of these may be administered, as an example.

To a subject provided with a label indicating chronic lymphocytic leukemia, cyclophosphamide, vincristine, fludarabine, rituximab, or a combination of these may be administered, as an example.

To a subject provided with a label indicating Hodgkin's lymphoma, radiation therapy or the like may be performed. To a subject provided with a label indicating Hodgkin's lymphoma, ABVD protocol in which vinblastine, bleomycin, doxorubicin, and dacarbazine are combined; a combination therapy of brentuximab vedotin, vinblastine, doxorubicin, and dacarbazine; or the like may be performed.

To a subject provided with a label indicating non-Hodgkin's lymphoma, radiation therapy or the like may be performed. To a subject provided with a label indicating non-Hodgkin's lymphoma, administration of rituximab, vincristine, doxorubicin, Endoxan, prednisolone, pirarubicin, etoposide, vindesine, or a combination of these, and/or administration of thalidomide such as lenalidomide may be performed, for example.

To a subject provided with a label indicating multiple myeloma, administration of bortezomib; dexamethasone; or thalidomide such as lenalidomide may be performed, for example.

7. Validation of Effects

Effects of the disease differentiation support method disclosed herein were validated.

7-1. Sample (1) Training Sample

Out of patients who consulted Juntendo University Hospital from February to September in 2017, EDTA collection of peripheral blood was performed on 34 patients already diagnosed as having polycythemia vera (PV), 168 patients already diagnosed as having essential thrombocythemia (ET), and 69 patients already diagnosed as having primary myelofibrosis (PMF), and the collected bloods were used as training samples.

(2) Validation Sample

Out of patients who consulted Juntendo University Hospital, EDTA collection of peripheral blood was performed on 9 patients already diagnosed as having polycythemia vera (PV), 53 patients already diagnosed as having essential thrombocythemia (ET), and 12 patients already diagnosed as having primary myelofibrosis (PMF), and the collected bloods were used as validation samples.

7-2. Obtainment and Selection of Parameters (1) Obtainment of First Parameter Group A smear preparation of peripheral blood was made, and parameters regarding abnormal finding were obtained by using Automated Digital Cell Morphology Analyzer DI-60 (SYSMEX corporation). Abnormal findings were obtained for a total of 181 items, i.e., 17 items of "type of cell" and "classification value", and 164 items of "dysmorphology feature".

(2) Obtainment of Second Parameter Group

Using a blood cell counter XN series, measurement values of 174 blood cell test items were obtained.

(3) Selection of First Parameter and Second Parameter

With respect to the first parameter group and the second parameter group above, in order to select items having a stronger relationship with disease differentiation, selection according to one-way analysis of variance (ANOVA) was performed.

A null hypothesis Ho according to ANOVA was assumed to be "there is no difference between groups", and an alternative hypothesis Hi was assumed to be "there is a difference between groups". A significance level p value was assumed to be 0.05, and an item having $p<0.05$ was extracted as an item having a higher relevance to a disease. By a significance test according to ANOVA, 44 items were extracted from the first parameter group and 121 items were extracted from the second parameter group. Table 1 shows examples of the extracted items and p values.

TABLE 1

| Parameter | P-value |
| --- | --- |
| HCT(%) | 3.08E−47 |
| RBC(10^4/uL) | 2.40E−46 |
| [IG %(%)] | 3.97E−46 |
| Q-Flag(Left Shift?) | 4.07E−41 |
| HGB(g/dL) | 4.17E−41 |
| morph_MMY | 1.77E−37 |
| [NE-WY] | 1.76E−36 |
| NRBC %(%) | 1.06E−34 |
| morph_MY | 8.74E−34 |
| IP SUS (WBC)Left Shift? | 1.56E−31 |
| HFR(%) | 2.34E−31 |
| Q-Flag(RBC Agglutination?) | 7.47E−31 |
| [NE-WX] | 1.96E−30 |
| morph_ERB | 1.27E−29 |
| [RBC-O(10^4/uL)] | 4.70E−29 |
| morph_BNE | 1.24E−28 |
| IRF(%) | 1.04E−27 |
| RBC/M | 2.24E−26 |
| EO %/M | 2.42E−24 |
| [PLT-F(10^4/uL)] | 2.67E−24 |
| [PLT-I(10^4/uL)] | 3.10E−24 |
| PLT(10^4/uL) | 6.90E−24 |
| PLT/M | 1.07E−23 |
| RDW-CV(%) | 4.78E−23 |
| PCT(%) | 7.57E−23 |

7-3. Training

With respect to each training sample, the first parameter group and the second parameter group selected in 7-2.(3) above were obtained, and a matrix in which these were arranged at the same hierarchical level was generated for each training sample. The disease label of each patient from whom a training sample was collected was associated to a corresponding matrix, whereby training data was made. The made training data was inputted to a gradient boosting tree, and the algorithm was trained, whereby a discriminator was generated. Python was used as software.

7-4. Validation

For each validation sample, the first parameter group and the second parameter group selected in 7-2.(3) above were obtained, and a matrix in which these were arranged at the same hierarchical level was generated for each validation sample. This was used as analysis data of each validation sample. Each generated analysis data was inputted to the discriminator, and a differentiation result was obtained.

Figure 19:
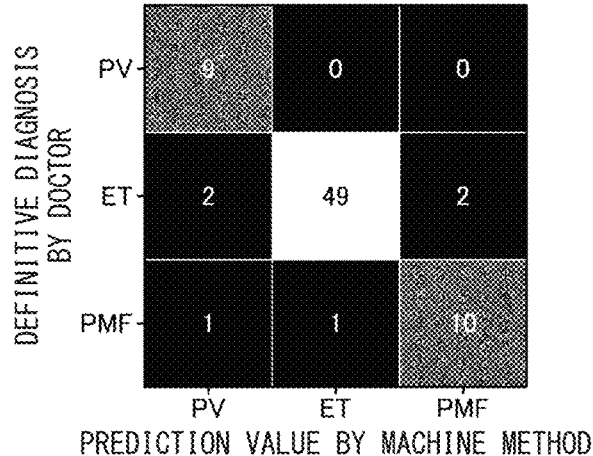
FIG. 19 shows a comparison between disease prediction results by a machine method and diagnoses by a doctor.

FIG. 19 shows a comparison between results by a machine method using the discriminator and definitive diagnoses by a doctor. 9 patients diagnosed as having PV by the doctor were all predicted as having PV also by the machine method. Out of 53 patients diagnosed as having ET by the doctor, 49 patients were predicted as having ET also by the machine method, and 2 patients were predicted as having PV and 2 patients were predicted as having PMF by the machine method. Out of 12 patients diagnosed as having PMF by the doctor, 10 patients were predicted as having PMF also by the machine method, and 1 patient was predicted as having PV and 1 patient was predicted as having ET by the machine method.

Figure 20:
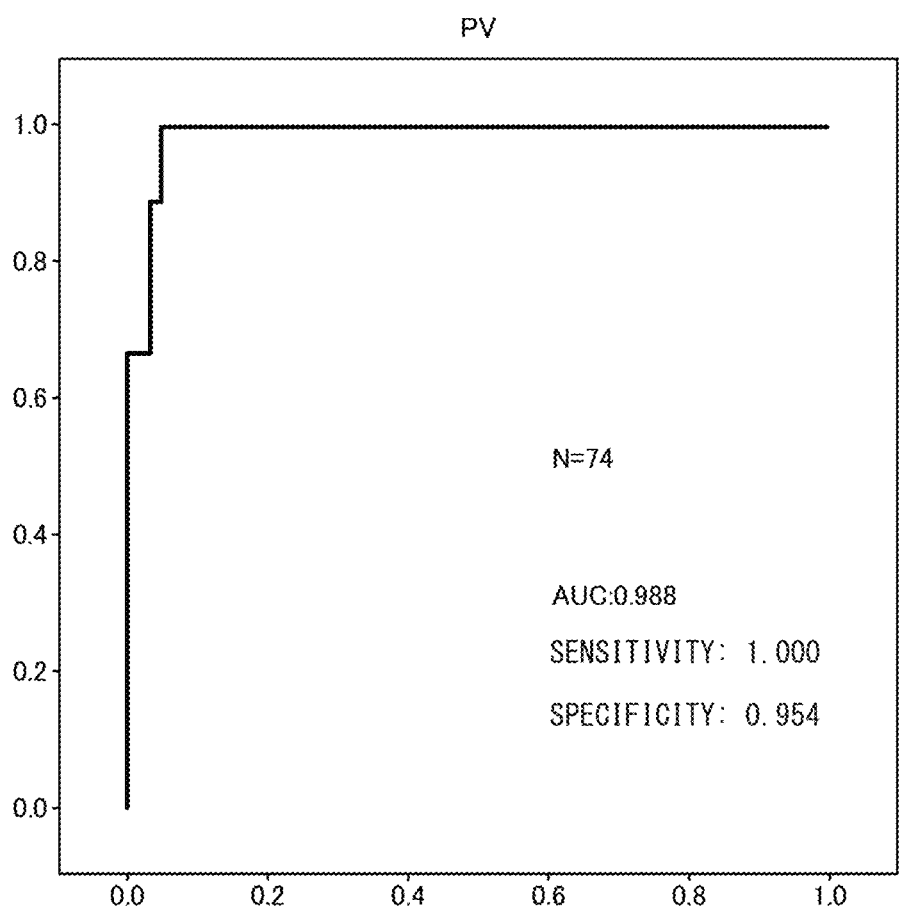
FIG. 20 shows a ROC curve of a prediction result of PV by the machine method.
Figure 21:
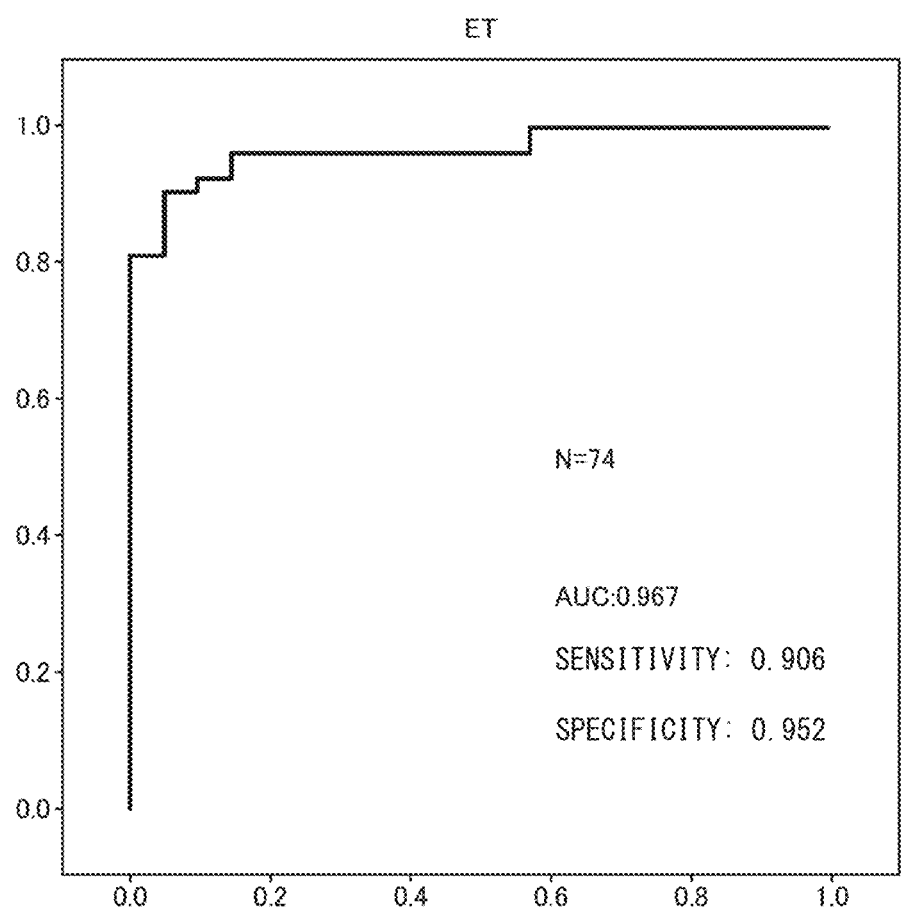
FIG. 21 shows a ROC curve of a prediction result of ET by the machine method.
Figures 22, 23, 24:
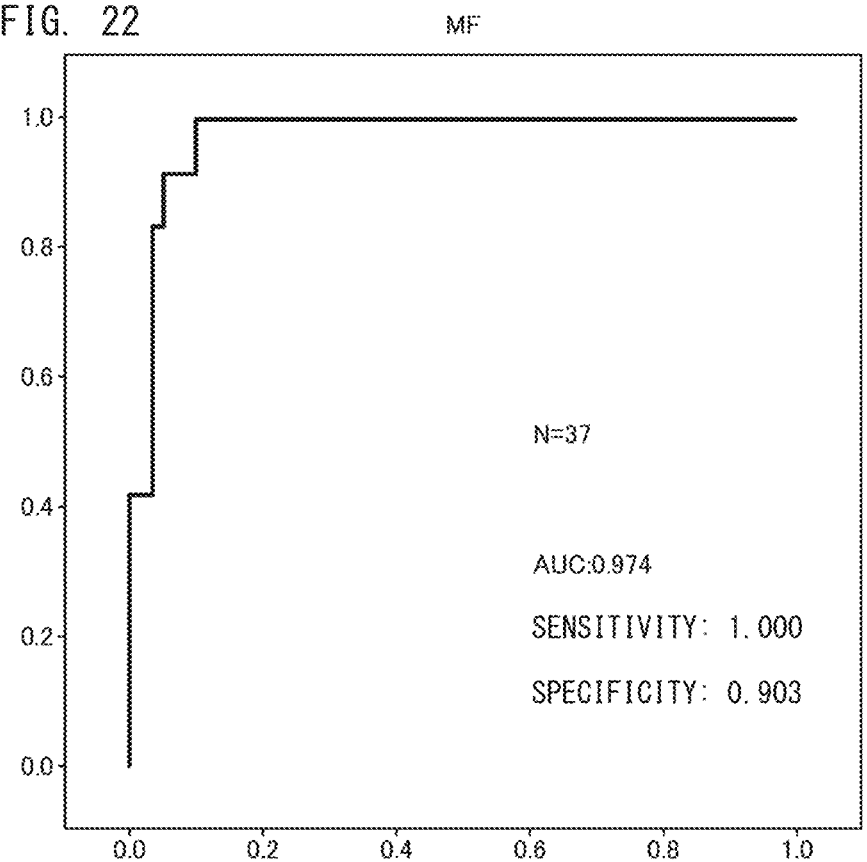
FIG. 22 shows a ROC curve of a prediction result of MF by the machine method.
FIG. 23 shows prediction accuracy of the machine method.
FIG. 24 shows a prediction result by the algorithm according to "Deep learning algorithms Support Distinction of PV, PMF, and ET Based on Clinical and Genetic Markers", by Manja Meggendorfer et al., Blood 2017 130:4223.

FIG. 20, FIG. 21, and FIG. 22 respectively show ROC curves of PV, ET, and PMF predicted by the machine method. FIG. 23 shows sensitivity, specificity, and AUC value obtained from each ROC curve. Each disease had a sensitivity and a specificity exceeding 90%, which was good. The AUC value exceeded 0.96, which was good.

7-5. Comparison with Conventional Method

FIG. 24 shows Figure B according to "Deep learning algorithms Support Distinction of PV, PMF, and ET Based on Clinical and Genetic Markers", by Manja Meggendorfer et al., Blood 2017 130:4223. In the method of "Deep learning algorithms Support Distinction of PV, PMF, and ET Based on Clinical and Genetic Markers", by Manja Meggendorfer et al., Blood 2017 130:4223, with respect to PMF, many cases determined as ET or PT or many cases unable to be determined are seen. From this, it is considered that the disease differentiation support method disclosed herein is more suitable for disease differentiation support

What is claimed is:

1. A system comprising:
 a cell image analysis apparatus comprising a stage on which a smear preparation, on which a blood sample is smeared, is set, a microscope, and a camera configured to capture images of cells, enlarged by the microscope, in the blood sample smeared on the smear preparation on the stage, the cell image analysis apparatus configured to analyze the images of the cells captured by the camera, and configured to output a first parameter regarding an abnormal finding in the captured cells based on analysis results of the images, wherein the captured cells are contained in the blood sample collected from a subject;
 a blood cell counter configured to measure a red blood cell count, a white blood cell count, a platelet count, a hemoglobin concentration, a hematocrit value, red blood cell indices, and white blood cell classification values, the blood cell counter comprising a flow cytometer and an electric resistance-type detector, the blood cell counter configured to analyze at least optical signals from the cells detected by the flow cytometer, and configured to output a second parameter regarding a number of the detected cells based on analysis results of the optical signals, wherein the detected cells are contained in the blood sample; and
 a computer comprising a processor and a memory storing a computer program, wherein the computer program, when executed by the computer, causes the computer to perform:
  obtaining the first parameter from the cell image analysis apparatus and the second parameter from the blood cell counter;
  generating, by using a pre-trained computer algorithm, information supporting disease differentiation of the subject, on the basis of the first parameter and the second parameter, wherein the information supporting disease differentiation includes a plurality of values each indicating a provability of each disease, and
  outputting the plurality of values.

2. The system of claim 1, wherein
 the cell image analysis apparatus is configured to analyze the images of the captured cells by a deep learning algorithm having a neural network structure and is configured to output the first parameter based on an output from the deep learning algorithm.

3. The system of claim 1, wherein
 the abnormal finding includes a finding related to nucleus morphology abnormality, granulation abnormality, cell size abnormality, cell malformation, cytoclasis, vacuole, immature cell, presence of inclusion body, Dohle body, satellitism, nucleoreticulum abnormality, petal-like nucleus, increased N/C ratio, bleb-like morphology, smudge, or hairy cell-like morphology.

4. The system of claim 3, wherein
 the nucleus morphology abnormality includes hypersegmentation, hyposegmentation, pseudo-Pelger anomaly, ring-shaped nucleus, spherical nucleus, elliptical nucleus, apoptosis, polynuclearity, karyorrhexis, enucleation, bare nucleus, irregular nuclear contour, nuclear fragmentation, internuclear bridging, multiple nuclei, cleaved nucleus, nuclear division, or nucleolus abnormality.

5. The system of claim 3, wherein
the granulation abnormality includes degranulation, granule distribution abnormality, toxic granule, Auer rod, Fagott cell, or pseudo Chediak-Higashi granule-like granule.

6. The system of claim 3, wherein
the cell size abnormality includes megathrombocyte.

7. The system of claim 1, wherein
the abnormal finding includes a plurality of types of abnormal findings.

8. The system of claim 1, wherein
the second parameter relates to numbers of a plurality of types of the detected cells.

9. The system of claim 1, wherein
the second parameter relates to a number of red blood cell, a number of nucleated red blood cell, a number of small red blood cell, a number of platelet, a number of reticulocyte, a number of immature granulocyte, a number of neutrophil, a number of eosinophil, a number of basophil, a number of lymphocyte, or a number of monocyte.

10. The system of claim 1, wherein
the computer algorithm includes a machine learning algorithm.

11. The system of claim 1, wherein
the computer algorithm includes a deep learning algorithm having a neural network structure.

12. The system of claim 1, wherein
the information supports differentiation of hematopoietic system diseases.

13. The system of claim 12, wherein
the hematopoietic system diseases include myeloproliferative neoplasms.

14. The system of claim 13, wherein
the myeloproliferative neoplasms include polycythemia vera, essential thrombocythemia, or primary myelofibrosis.

15. The system of claim 12, wherein
the hematopoietic system diseases include leukemia, myelodysplastic syndrome, lymphoma, or myeloma.

16. The system of claim 1, wherein
the blood sample is sample of a peripheral blood.

17. A method for supporting disease differentiation, comprising:
by a cell image analysis apparatus comprising a stage on which a smear preparation, on which a blood sample is smeared, is set, a microscope, and a camera configured to capture images of cells, enlarged by the microscope, in the blood sample smeared on the smear preparation on the stage, analyzing the images of the cells captured by the camera, and outputting a first parameter regarding an abnormal finding in the captured cells based on analysis results of the images, wherein the captured cells are contained in the blood sample collected from a subject;
by a blood cell counter configured to measure a red blood cell count, a white blood cell count, a platelet count, a hemoglobin concentration, a hematocrit value, red blood cell indices, and white blood cell classification values, the blood cell counter comprising a flow cytometer and an electric resistance-type detector, analyzing at least optical signals from cells detected by the flow cytometer, and outputting a second parameter regarding a number of the detected cells based on analysis results of the optical signals, wherein the detected cells are contained in the blood sample; and
by a computer comprising a processor and a memory storing a computer program,
obtaining the first parameter from the cell image analysis apparatus and the second parameter from the blood cell counter,
generating, by using a pre-trained computer algorithm, information supporting disease differentiation of the subject, on the basis of the first parameter and the second parameter, wherein the information supporting disease differentiation includes a plurality of values each indicating a provability of each disease, and
outputting the plurality of values.

18. The system of claim 1, wherein
the blood cell counter is configured to analyze the optical signals from the cells detected by the flow cytometer and electric signals from the cells detected by the electric resistance-type detector, and output the second parameter based on the analysis results of the optical signals and analysis results of the electric signals.

* * * * *